(12) United States Patent
Uejima

(10) Patent No.: US 8,589,458 B2
(45) Date of Patent: Nov. 19, 2013

(54) ELECTRONIC CALCULATOR WITH TOUCH SCREEN

(75) Inventor: Hiroshi Uejima, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 643 days.

(21) Appl. No.: 12/834,222

(22) Filed: Jul. 12, 2010

(65) Prior Publication Data

US 2011/0016165 A1    Jan. 20, 2011

(30) Foreign Application Priority Data

Jul. 17, 2009    (JP) .................................. 2009-169120

(51) Int. Cl.
G06F 3/00    (2006.01)

(52) U.S. Cl.
USPC .......................................................... 708/141

(58) Field of Classification Search
USPC .......................................................... 708/141
See application file for complete search history.

(56) References Cited

U.S. PATENT DOCUMENTS 5,428,805 A * 6/1995 Morgan ......................... 708/141

FOREIGN PATENT DOCUMENTS

| JP | 62-015054 | 1/1987 |
|---|---|---|
| JP | 09-044451 | 2/1997 |
| JP | 11-073271 A | 3/1999 |
| JP | 2000-057361 A | 2/2000 |
| JP | 2001134382 | 5/2001 |
| JP | 2003-296285 | 10/2003 |
| JP | 2003344059 | 12/2003 |
| JP | 2004126665 | 4/2004 |
| JP | 2004-355508 A | 12/2004 |
| JP | 2006139806 | 6/2006 |
| JP | 2007-172382 | 7/2007 |
| JP | 2008140148 | 6/2008 |
| JP | 2009015388 | 1/2009 |
| JP | 2010-250465 | 11/2010 |

OTHER PUBLICATIONS

Japanese Office Action for Application No. 2009-169120 mailed on Apr. 19, 2011.

* cited by examiner

Primary Examiner — Tan V. Mai
(74) Attorney, Agent, or Firm — Turocy & Watson, LLP

(57) ABSTRACT

According to one embodiment, there is provided an electronic device including a display device configured to detect a contact position, a storage in which data is stored, a touch manipulation mode and operational processing being correlated with each other in the data, and a processor that causes the display device to display a mathematical formula, determines the touch manipulation mode detected by the display device, reads the operational processing corresponding to the determined touch manipulation mode from the storage, performs the operational processing on the mathematical formula displayed on the display device, and causes the display device to display a mathematical formula of result of the performed operational processing.

7 Claims, 30 Drawing Sheets

TOUCH "TWO VERTICAL POINTS" SOMEWHERE ON SCREEN

DRAG TOUCHED TWO POINTS SO AS TO TWIST TWO POINTS AND RELEASE TWO POINTS

TOUCH "TWO VERTICAL POINTS" SOMEWHERE ON SCREEN

DRAG TWO POINTS INWARD

FIG.8A
0.25
— 18
FIG.8B
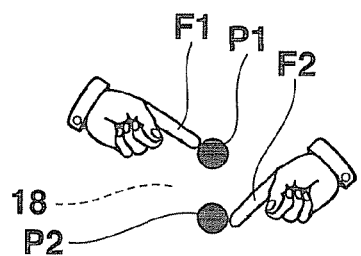
TOUCH "TWO VERTICAL POINTS" SOMEWHERE ON SCREEN
FIG.8C
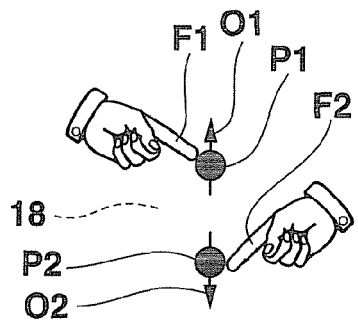
DRAG TWO POINTS OUTWARD
FIG.8D
$$\frac{1}{4}$$
— 18

TOUCH AND SELECT ONE END

TOUCH SOMEWHERE ON SCREEN AND DRAG DIRECTLY IN OPPOSITE DIRECTION TO SELECTED POINT

TOUCH AND SELECT ONE END

TOUCH SOMEWHERE ON SCREEN
AND DRAG DIRECTLY ONTO
SELECTED POINT SIDE

FIG.23A  `0.25` -- 18

TOUCH AND DRAG UPWARD SOMEWHERE ON SCREEN

FIG.23C  $\frac{1}{4}$ -- 18

ELECTRONIC CALCULATOR WITH TOUCH SCREEN

CROSS-REFERENCE TO RELATED APPLICATIONS

This application is based upon and claims the benefit of priority from prior Japanese Patent Application No. 2009-169120, filed Jul. 17, 2009, the entire contents of which are incorporated herein by reference.

BACKGROUND OF THE INVENTION

1. Field of the Invention

The present invention relates to electronic devices such as an electronic calculator with a touch screen and a computer-readable medium storing a control program of the electronic device.

2. Description of the Related Art

In conventional calculators, in order that a mathematical formula is displayed while transforms such as "reciprocal", "decimal→fraction", "fraction→decimal", "factorization", and "expansion" are performed for the mathematical formula, it is necessary for a user to select an item from a menu or input a command, and to learn a complicated key manipulation.

In a conventional calculator having a graphic drawing function, in order that a graphic is displayed while an angle or a line segment of the graphic is changed and deformed, similarly to the case in which the mathematical formula is displayed while transformed, it is necessary to learn a more complicated key manipulation such that the item is selected from the menu or the command is input.

On the other hand, for example, Jpn. Pat. Appln. KOKAI Publication No. 2009-015388 discloses a graph scientific calculator, in which a touch panel is mounted, and a touch manipulation can be performed on the touch panel to select the item of the menu or to provide the command instead of the key and mouse manipulations, thereby improving operability.

The touch panel is merely used instead of the mouse or the key in the conventional graph scientific calculator on which the touch panel is mounted, and the touch panel is used only as a continuation of a conventional input method in which "the displayed item is selected and input".

On the other hand, in an electronic device on which a touch panel is mounted to display an image, there is a function of touching and moving the display image or spreading or narrowing a touch width by multi touch, thereby intuitively enlarging or contracting the display image.

However, in the conventional electronic devices, the mathematical formula cannot be displayed while transformed in response to the user's intuitive touch manipulation performed for the mathematical formula on the display screen.

BRIEF SUMMARY OF THE INVENTION

It is an object of the invention to provide an electronic device in which the user does not need to learn a complicated manipulation, and the mathematical formula can be displayed while transformed in response to the user's intuitive manipulation, and a computer-readable medium storing a control program of the electronic device.

According to a first aspect of the present invention, there is provided an electronic device comprising: a display device configured to detect a contact position; a storage in which data is stored, a touch manipulation mode and operational processing being correlated with each other in the data; and a processor that causes the display device to display a mathematical formula, determines the touch manipulation mode detected by the display device, reads the operational processing corresponding to the determined touch manipulation mode from the storage, performs the operational processing on the mathematical formula displayed on the display device, and causes the display device to display a mathematical formula of result of the performed operational processing.

According to a second aspect of the present invention, there is provided an electronic device comprising: a display device configured to detect a contact position; a storage in which data is stored, a touch manipulation mode and graphic deformation processing being correlated with each other in the data; and a processor that causes the display device to display a graphic, determines the touch manipulation mode detected by the display device, reads the graphic deformation processing corresponding to the determined touch manipulation mode from the storage, performs the graphic deformation processing on the graphic displayed on the display device, and causes the display device to display a graphic of result of the performed graphic deformation processing, wherein, in the storage, the touch manipulation modes which serve as a pair of modes opposite to each other are correlated to the pieces of graphic deformation processing which serve as pathways opposite to each other in the data in which the touch manipulation mode and the graphic deformation processing are correlated, and the pieces of graphic deformation processing which serve as the pathways opposite to each other include angle increasing deformation processing and angle decreasing deformation processing or graphic dividing deformation processing and graphic combining deformation processing.

According to a third aspect of the present invention, there is provided a computer-readable medium in which a software program is stored, the software program being executed by a computer system having a display device configured to detect a contact position and a storage, the software program including a sequence of commands for causing the computer system to perform pieces of processing, the pieces of processing comprising: storing data in the storage, a touch manipulation mode and operational processing being correlated with each other in the data; causing the display device to display a mathematical formula; determining the touch manipulation mode detected by the display device; reading the operational processing corresponding to the determined touch manipulation mode from the storage; performing the operational processing on the mathematical formula displayed on the display device; and causing the display device to display a mathematical formula of result of the performed operational processing.

According to a fourth aspect of the present invention, there is provided a computer-readable medium in which a software program is stored, the software program being executed by a computer system having a display device configured to detect a contact position and a storage, the software program including a sequence of commands for causing the computer system to perform pieces of processing, the pieces of processing comprising: storing data in the storage, a touch manipulation mode and graphic deformation processing being correlated with each other in the data; causing the display device to display a graphic; determining the touch manipulation mode detected by the display device; reading the graphic deformation processing corresponding to the determined touch manipulation mode from the storage; performing the graphic deformation processing on the graphic displayed on the display device; and causing the display device to display a graphic of result of the performed graphic deformation processing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 8A, 8B, 8C, and 8D illustrate a multi-touch manipulation state associated with the formula transform operational processing (part 3) of the graph scientific calculator 10 and a display state of a mathematical formula fraction-transformed according to a manipulation mode of the multi-touch manipulation state;

FIGS. 23A, 23B, and 23C illustrate a single-touch manipulation state associated with the formula transform operational processing (part 11) of the graph scientific calculator 10 and a display state of a mathematical formula fraction-transformed according to a manipulation mode of the single-touch manipulation state;

DETAILED DESCRIPTION OF THE INVENTION

Embodiments of the present invention will be described below with reference to the drawings.

Figure 1:
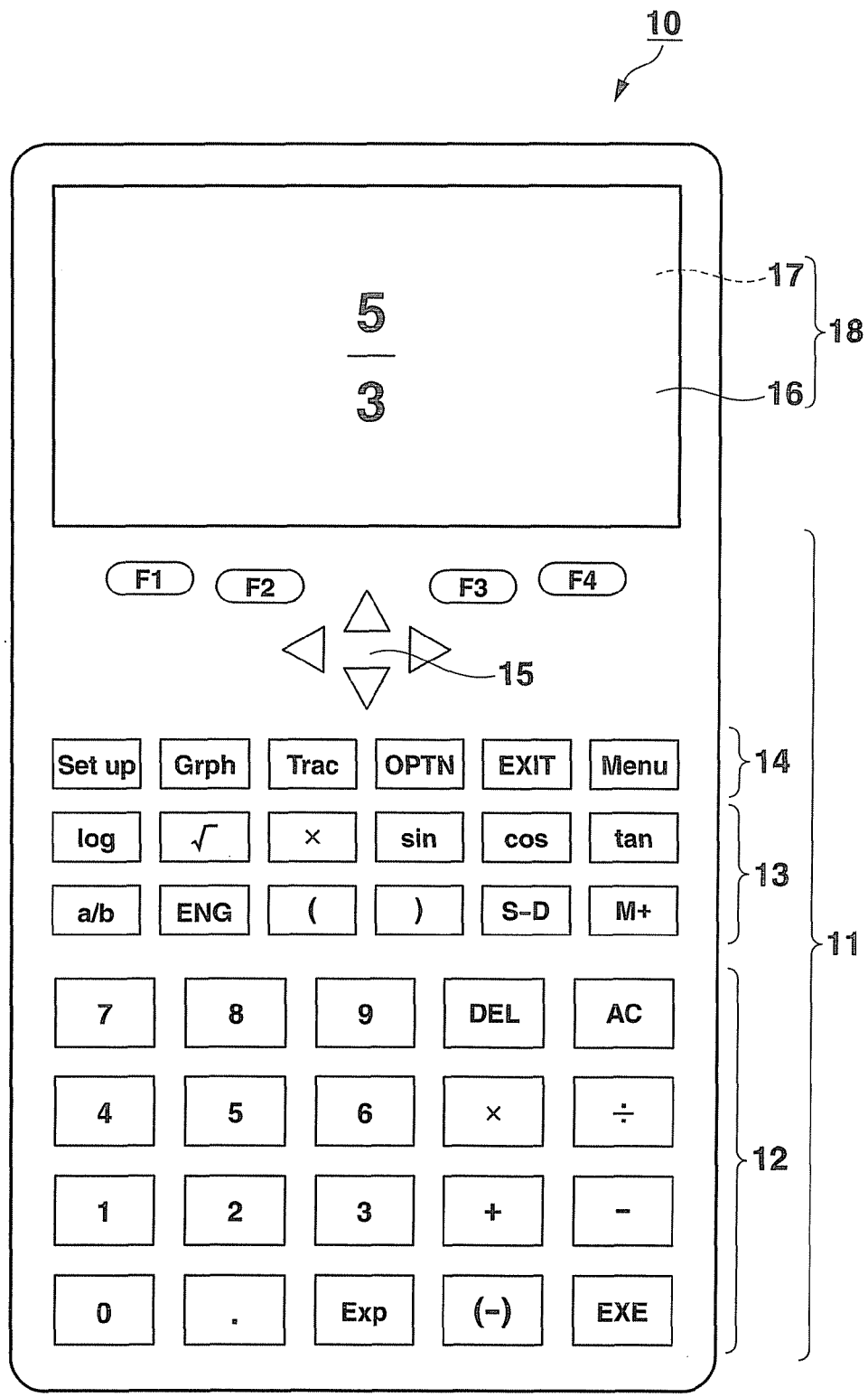
FIG. 1 is a front view illustrating an appearance configuration of a graph scientific calculator 10 that is an electronic device according to an embodiment of the invention.

FIG. 1 is a front view illustrating an appearance configuration of a graph scientific calculator 10 that is an electronic device provided with a touch screen according to an embodiment of the invention.

The graph scientific calculator 10 is formed into a compact size so that a user can sufficiently grasp and manipulate it by one hand due to the need of portability. A key input unit 11 and a dot-matrix liquid crystal display unit 16 are provided in a front surface of the main body of the calculator 10.

The key input unit 11 includes a numeric character/letter/calculation symbol key group 12, a calculation function setup key group 13, a mode setup key group 14, a cursor key 15, and function keys "F1" to "F4". The numeric character/letter/calculation symbol key group 12 is used to input numeric characters, letters, and various operation symbols or to provide an instruction to perform the calculation. The calculation function setup key group 13 is used to set various functional functions and a memory function. The mode setup key group 14 is used to set various behavior modes such as an operation mode and a graphic drawing mode and to display a menu screen. The cursor key 15 is used to manipulate movement of a cursor Cu displayed on the display unit 16 and selection of a data item. The function keys [F1] to [F4] are used to selectively specify menus of various functions displayed along a lower end of the display unit 16.

For example, "0" to "9" (numeric character) keys, "+", "−", "×", and "÷" (arithmetic symbol) keys, a "DEL" (deletion) key, an "EXE" (execution) key, and an "AC" (clear) key are arrayed as the numeric character/letter/calculation symbol key group 12.

For example, a "log" (logarithm) key, a "√" (square root) key, and a "sin" key, a "cos" key, and "tan" key of trigonometric functions are arrayed as the calculation function setup key group 13.

For example, a "Menu" (menu) key, a "Setup" (setup) key, a "Graph" (graph) key, a "Trac" (trace) key, and an "EXIT" (finish) key are arrayed as the mode setup key group 14.

The display unit 16 includes a dot-matrix liquid crystal display unit. A touch panel 17, which is a transparent tablet, is overlaid on a display screen of the display unit 16, thereby acting as a touch screen 18.

Figure 2:
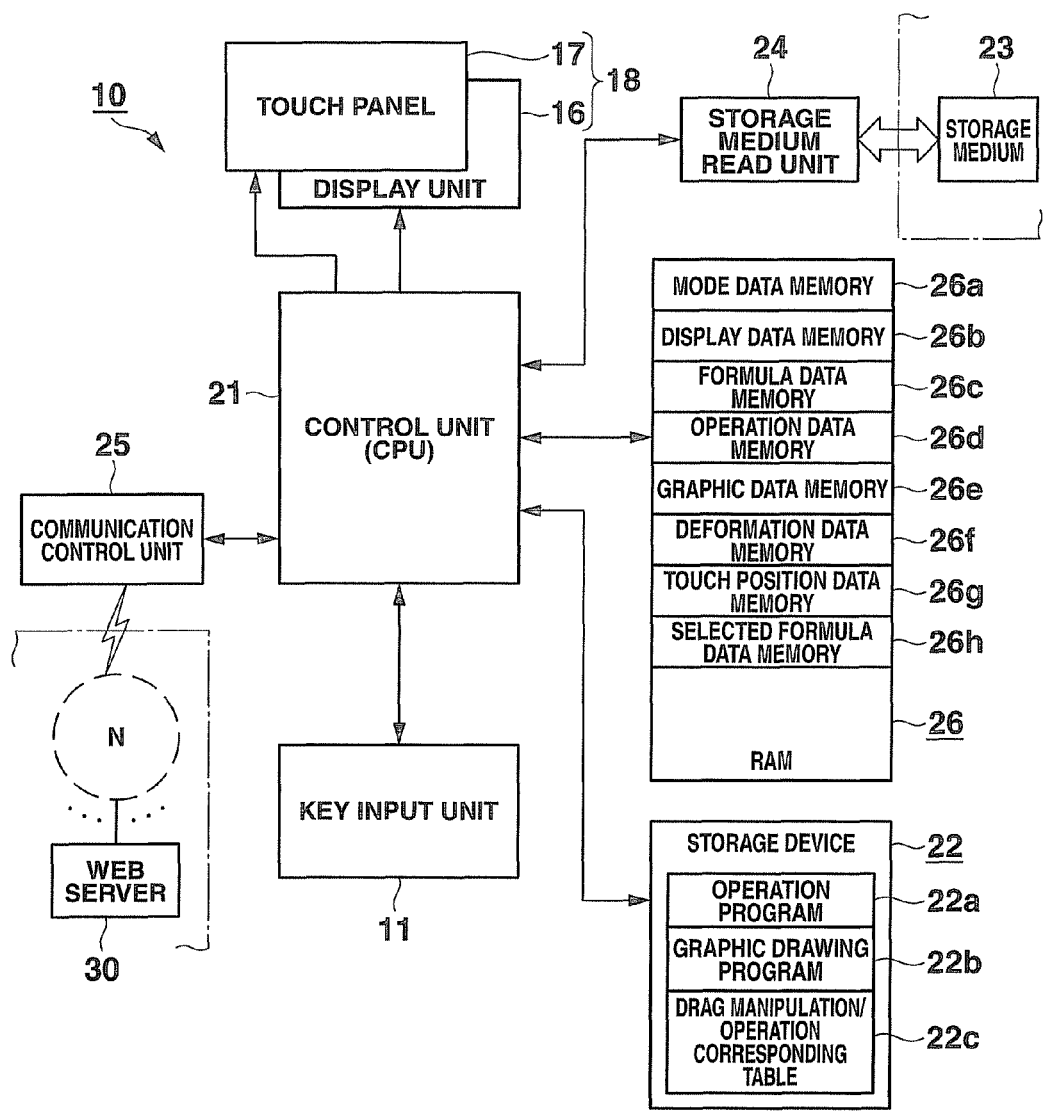
FIG. 2 is a block diagram illustrating a configuration of an electronic circuit of the graph scientific calculator 10.

FIG. 2 is a block diagram illustrating a configuration of an electronic circuit of the graph scientific calculator 10.

The graph scientific calculator 10 includes a control unit (CPU) 21.

The control unit (CPU) 21 controls a behavior of each unit of the circuit with a RAM 26 as a work memory according to a calculator control program stored in a storage device (flash ROM) 22.

The calculator control program may previously be stored in the storage device 22, read into the storage device 22 from an external storage medium 23 such as a memory card through a storage medium read unit 24, or read into the storage device 22 by downloading from a Web server (program server) 30 on a communication network N through a communication control unit 25.

The calculator control program stored in the storage device 22 is started in response to a key input signal from the key input unit 11 or a touch position detection signal from the touch screen 18 (touch panel 17).

For example, an operation program 22a that is used to perform operational processing for various mathematical formulas according to the user manipulation and a graphic drawing program 22b that is used to draw various graphics according to the user manipulation are stored in the storage device 22 in addition to the calculator control program that is used to control the whole of the calculator 10.

A drag manipulation/operation corresponding table 22c is also stored in the storage device 22. Various modes of drag manipulations and types of operations, which are performed to transform a mathematical formula into another mathematical formula corresponding to the drag manipulation mode, are stored in the drag manipulation/operation corresponding table 22c while correlated with each other. Each of the drag manipulation modes includes positions of a sequence of touch→drag→release that is performed by the user while the mathematical formula is displayed on the touch screen 18 and a locus thereof.

Additionally, various modes of drag manipulations and types of operations, which are performed to deform a graphic into another graphic corresponding to the drag manipulation mode, are stored in the drag manipulation/operation corresponding table 22c while correlated with each other. Each of the drag manipulation modes includes positions of a sequence of touch→drag→release that is performed by the user while the graphic is displayed on the touch screen 18 and a locus thereof.

The control unit (CPU) 21 is connected to the storage device 22, the storage medium read unit 24, the communication control unit 25, the RAM 26, the key input unit 11, and the touch screen 18 that includes the liquid crystal display unit (LCD) 16 and the touch panel 17.

The RAM 26 includes a mode data memory 26a, a display data memory 26b, a formula data memory 26c, an operation data memory 26d, a graphic data memory 26e, a deformation data memory 26f, a touch position data memory 26g, and a selected-formula data memory 26h. Various pieces of data are input to and output from the control unit 21 as a result of various pieces of operational processing or drawing processing, and are stored in the RAM 26 if needed.

Pieces of data indicating a currently-set behavior mode, such as a normal operation mode, a formula transform operation mode, a graphic deformation operation mode, a program operation mode, and a graph mode, which are set based on the manipulation of the mode setup key group 14, are stored in the mode data memory 26a.

Bitmap pattern data that is produced with a display screen size in order to display the bitmap pattern on the display unit 16 is stored in the display data memory 26b.

Mathematical formula data that is input in response to the user manipulation of the key input unit 11 or touch screen 18 is stored in the formula data memory 26c.

Data associated with the operational processing performed to the mathematical formula, which is read from the formula data memory 26c and displayed on the touch screen 18, is stored in the operation data memory 26d.

Graphic data input in response to the user manipulation of the key input unit 11 or touch screen 18 is stored in the graphic data memory 26e.

Data of the graphic deformed by the operational processing performed for the graphic, which is read from the graphic data memory 26e and displayed on the touch screen 18, is stored in the deformation data memory 26f.

Coordinate data of a touch position, which is detected in response to the user's touch manipulation performed on the touch screen (touch panel 17) 18, is stored in the touch position data memory 26g.

The mathematical formula is stored as an active formula in the selected formula data memory 26h when one mathematical formula is displayed on the touch screen 18. The mathematical formula selected in response to the key manipulation or touch manipulation is stored as the active formula in the selected formula data memory 26h when plural mathematical formulas are displayed on the touch screen 18. When each of the numeric characters, letters, or symbols constituting the mathematical formula displayed on the touch screen 18 is selected by the key manipulation or touch manipulation, each of the selected numeric characters, letters, or symbols is stored.

A behavior of the graph scientific calculator 10 having the above-described configuration will be described below.

(Formula Transform Operation Function)

Figure 3:
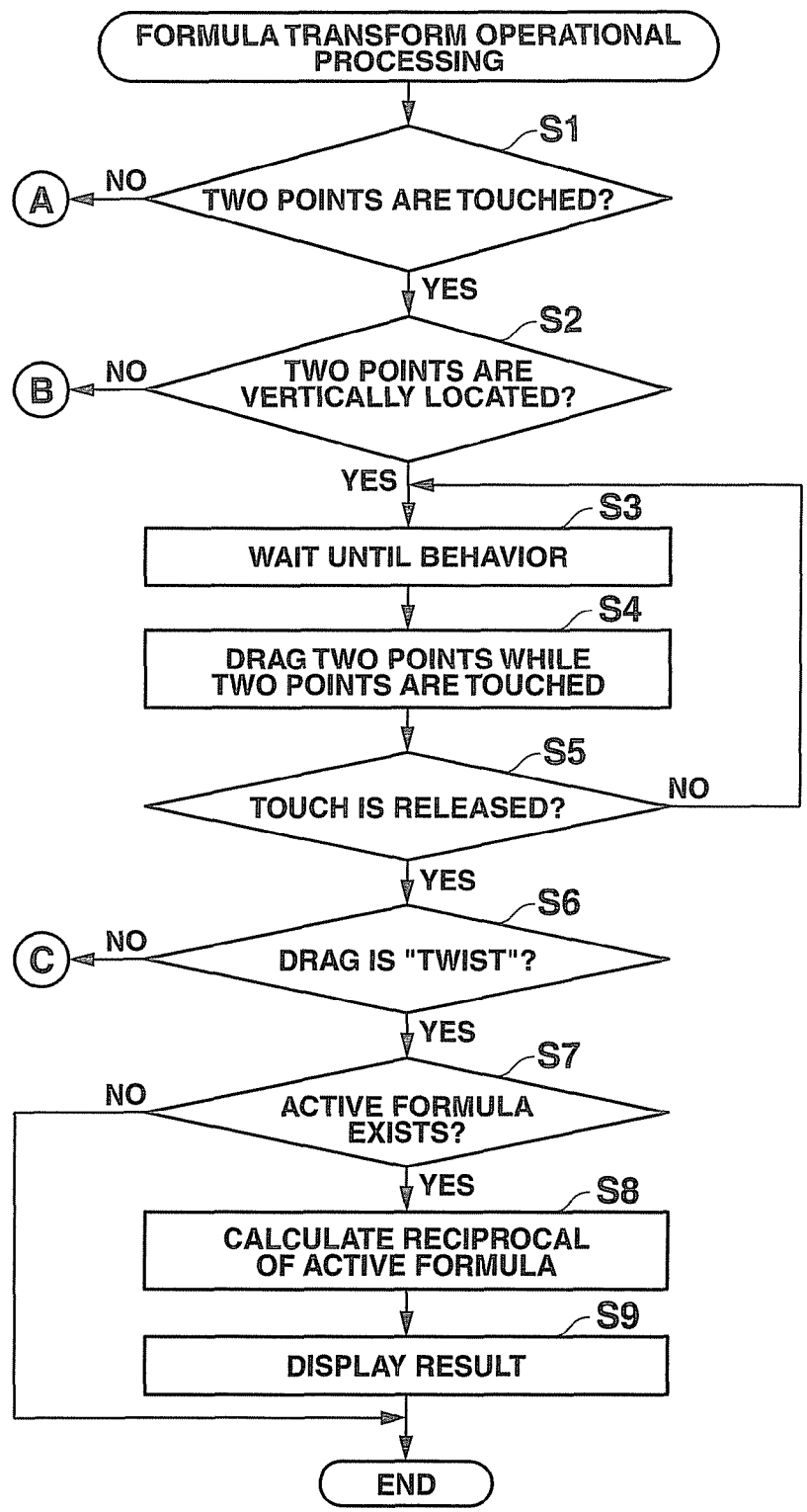
FIG. 3 is a flowchart illustrating formula transform operational processing (part 1) in which a touch screen 18 of the graph scientific calculator 10 is used.

FIG. 3 is a flowchart illustrating formula transform operational processing (part 1) in which the touch screen 18 of the graph scientific calculator 10 is used.

FIGS. 4A, 4B, 4C, and 4D illustrate a multi-touch manipulation state associated with the formula transform operational processing (part 1) of the graph scientific calculator 10 and a display state of a mathematical formula reciprocal-transformed according to a manipulation mode of the multi-touch manipulation state.

Figure 4A:
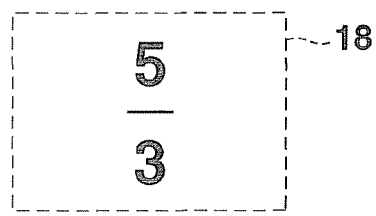
FIGS. 4A, 4B, 4C, and 4D illustrate a multi-touch manipulation state associated with the formula transform operational processing (part 1) of the graph scientific calculator 10 and a display state of a mathematical formula reciprocal-transformed according to a manipulation mode of the multi-touch manipulation state.
Figure 4B:
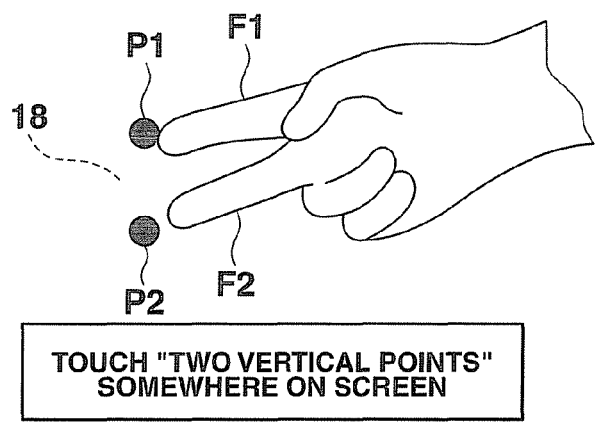

For example, as illustrated in FIG. 4A, a fraction formula [5/3] is displayed on the touch screen 18 in response to the user manipulation of the key input unit 11. At this point, when the user touches the two vertical points P1 and P2 with user's two fingers F1 and F2 somewhere on the touch screen 18 as illustrated in FIG. 4B, it is determined that the two points P1 and P2 are touched based on the coordinate data of each touch position stored in the touch position data memory 26g (YES in Step S1), and it is determined that the two points P1 and P2 are vertically located (YES in Step S2).

Figure 4C:
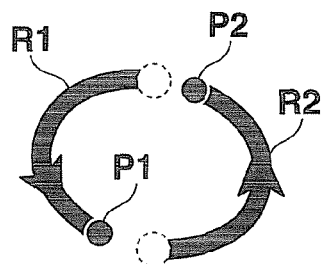

When the two touch positions P1 and P2 are released after being dragged on the touch screen 18 with the user's two fingers F1 and F2 so as to be twisted as indicated by arrows R1 and R2 of FIG. 4C, the drag behavior is recognized based on the coordinate data and locus data of each touch position stored in the touch position data memory 26g (Steps S3 and S4), after which the release of the touch manipulation is determined (YES in Step S5), and it is determined that the "twist" drag manipulation is performed (YES in Step S6).

Therefore, it is determined whether the active mathematical formula exists on the touch screen 18 based on the formula data stored in the selected formula data memory 26h (Step S7).

Because of the determination that the active fraction formula [5/3] exists on the touch screen 18 (YES in Step S7), the operation type "reciprocal" correlated with a drag manipulation mode "multi touch of two vertical points+twist" is read from the drag manipulation/operation corresponding table 22c to perform the operational processing for transforming the active fraction formula [5/3] into the reciprocal (Step S8).

Figure 4D:
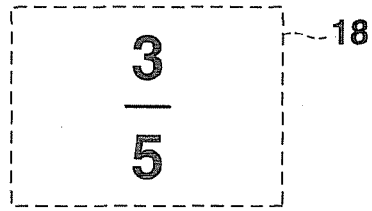

As illustrated in FIG. 4D, a fraction formula [3/5] that is transformed into the reciprocal through the reciprocal operational processing is displayed on the touch screen 18 (Step S9).

An error message is displayed on the touch screen 18 (Step S9), when the operational processing for transforming the active mathematical formula on the touch screen 18 into the "reciprocal" cannot be performed in Step S8.

Therefore, on the touch screen 18 on which the arbitrary mathematical formula is displayed, the drag manipulation is performed by twisting the fingers F1 and F2 with which the two vertical points P1 and P2 are multi-touched, whereby the mathematical formula can immediately be displayed as a reciprocal-transformed mathematical formula to perform intuitive learning.

Figure 5:
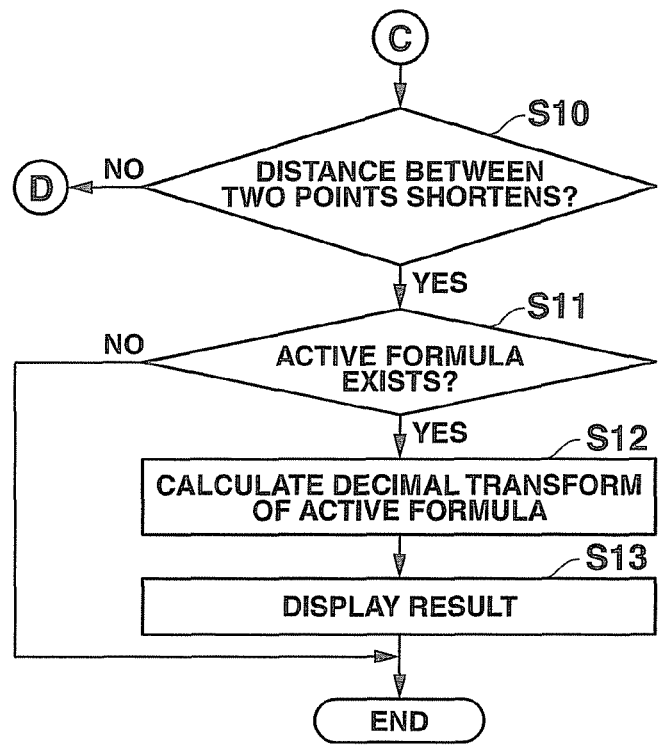
FIG. 5 is a flowchart illustrating formula transform operational processing (part 2) in which the touch screen 18 of the graph scientific calculator 10 is used.

FIG. 5 is a flowchart illustrating formula transform operational processing (part 2) in which the touch screen 18 of the graph scientific calculator 10 is used.

Figure 6:
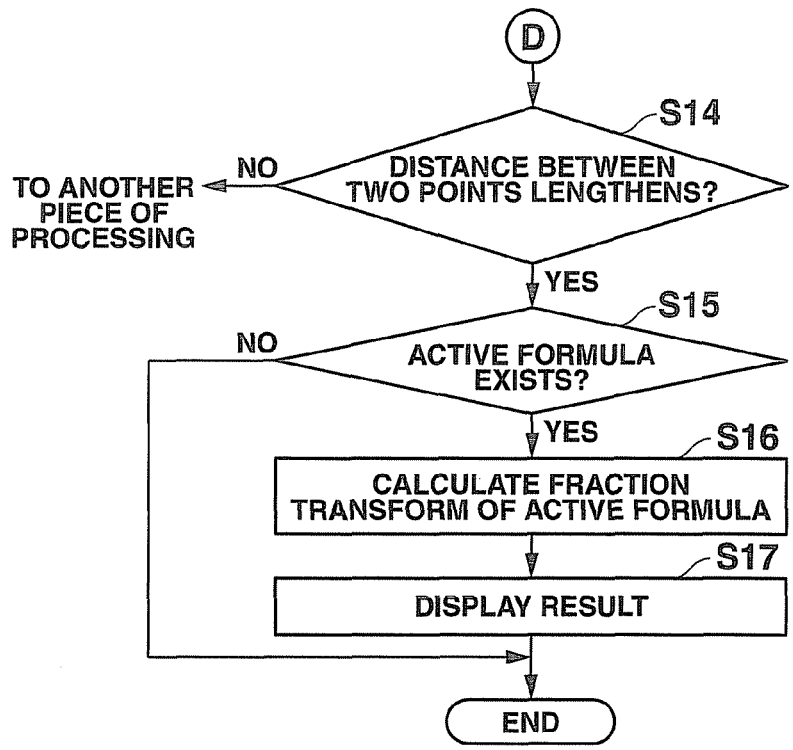
FIG. 6 is a flowchart illustrating formula transform operational processing (part 3) in which the touch screen 18 of the graph scientific calculator 10 is used.

FIG. 6 is a flowchart illustrating formula transform operational processing (part 3) in which the touch screen 18 of the graph scientific calculator 10 is used.

FIGS. 7A, 7B, 7C, and 7D illustrate a multi-touch manipulation state associated with the formula transform operational processing (part 2) of the graph scientific calculator 10 and a display state of a mathematical formula decimal-transformed according to a manipulation mode of the multi-touch manipulation state.

FIGS. 8A, 8B, 8C, and 8D illustrate a multi-touch manipulation state associated with the formula transform operational processing (part 3) of the graph scientific calculator 10 and a display state of a mathematical formula fraction-transformed according to a manipulation mode of the multi-touch manipulation state.

Figure 7A:
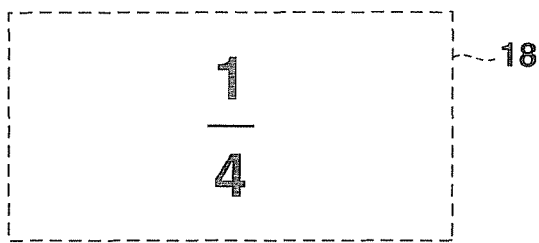
FIGS. 7A, 7B, 7C, and 7D illustrate a multi-touch manipulation state associated with the formula transform operational processing (part 2) of the graph scientific calculator 10 and a display state of a mathematical formula decimal-transformed according to a manipulation mode of the multi-touch manipulation state.
Figure 7B:
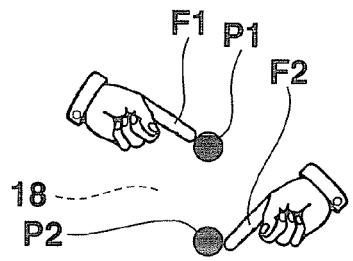
Figure 7C:
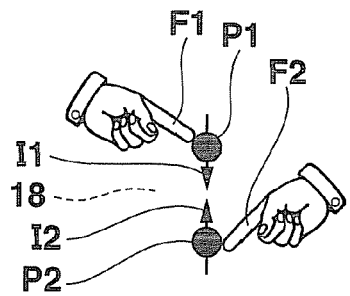

For example, as illustrated in FIG. 7A, a fraction formula [1/4] is displayed on the touch screen 18 in response to the user manipulation of the key input unit 11. At this point, as illustrated in FIG. 7B, the two vertical points P1 and P2 are touched somewhere on the touch screen 18 with user's two fingers F1 and F2 (YES in Step S1→YES in Step S2). Then, the two touch positions P1 and P2 are dragged in a direction in which the two points P1 and P2 come close to each other as indicated by arrows I1 and I2 of FIG. 7C, and the two points P1 and P2 are released.

After the drag behavior is recognized based on coordinate data and locus data of each touch position stored in the touch position data memory 26g (Steps S3 and S4), it is determined that the touch manipulation is released (YES in Step S5), and that a drag manipulation in which "distance between two points shortens" is performed (YES in Step S10).

At this point, because of the determination that the active fraction formula [1/4] exists on the touch screen 18 (YES in Step S11), an operation type "decimal transform" corresponding to a drag manipulation mode "multi touch of two vertical points+distance between two points shortens" is read from the drag manipulation/operation corresponding table 22c to perform the operational processing for transforming the active fraction formula [1/4] into the decimal (Step S12).

Figure 7D:
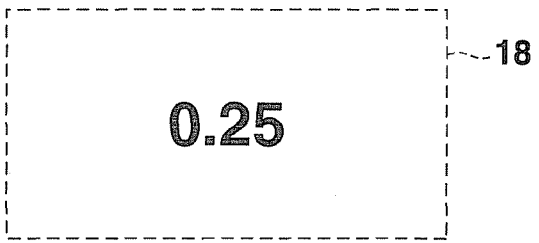

As illustrated in FIG. 7D, a decimal formula [0.25] that is transformed into the decimal through the decimal-transform operational processing is displayed on the touch screen 18 (Step S13).

When the operational processing for transforming the active mathematical formula on the touch screen 18 into the "decimal" cannot be performed in Step S12, an error message is displayed on the touch screen 18 (Step S13).

Therefore, on the touch screen 18 on which an arbitrary mathematical formula is displayed, the drag manipulation is inwardly performed such that the fingers F1 and F2 with which the two vertical points P1 and P2 are multi-touched are brought close to each other, whereby the mathematical formula can immediately be displayed as a decimal-transformed mathematical formula to perform the intuitive learning.

For example, as illustrated in FIG. 8A, the decimal formula [0.25] is displayed on the touch screen 18 in response to the user manipulation of the key input unit 11. At this point, as illustrated in FIG. 8B, the two vertical points P1 and P2 are touched somewhere on the touch screen 18 with user's two fingers F1 and F2 (YES in Step S1→YES in Step S2). Then, the two touch positions P1 and P2 are dragged in a direction in which the two points P1 and P2 move away from each other as indicated by arrows O1 and O2 of FIG. 8C, and the two points P1 and P2 are released.

After the drag behavior is recognized based on the coordinate data and locus data of each touch position stored in the touch position data memory 26g (Steps S3 and S4), it is determined that the touch manipulation is released (YES in Step S5), and that a drag manipulation in which "distance between two points lengthens" is performed (YES in Step S14).

At this point, because of the determination that the active decimal formula [0.25] exists on the touch screen 18 (YES in Step S15), an operation type "fraction transform" corresponding to a drag manipulation mode "multi touch of two vertical points+distance between two points lengthens" is read from the drag manipulation/operation corresponding table 22c to perform the operational processing for transforming the active decimal formula [0.25] into the fraction (Step S16).

As illustrated in FIG. 8D, the fraction formula [1/4] that is transformed into the fraction through the fraction-transform operational processing is displayed on the touch screen 18 (Step S17).

When the operational processing for transforming the active mathematical formula on the touch screen 18 into the "fraction" cannot be performed in Step S16, an error message is displayed on the touch screen 18 (Step S17).

Therefore, on the touch screen 18 on which an arbitrary mathematical formula is displayed, the drag manipulation is outwardly performed such that the fingers F1 and F2 with which the two vertical points P1 and P2 are multi-touched move away from each other, whereby the mathematical formula can immediately be displayed as a fraction-transformed mathematical formula to perform the intuitive learning.

Accordingly, as illustrated in FIGS. 5 to 8D, for the pair of touch manipulation modes, that is, the drag manipulation in which the two vertical points multi-touched with the fingers are dragged inward so as to come close to each other and the drag manipulation in which the two vertical points multi-touched with the fingers are dragged outward so as to move away from each other, the pieces of operational processing which serve as pathways opposite to each other are performed such that the fraction is transformed into the decimal and the decimal is transformed into the fraction, so that the intuitive learning can be performed.

Figure 9:
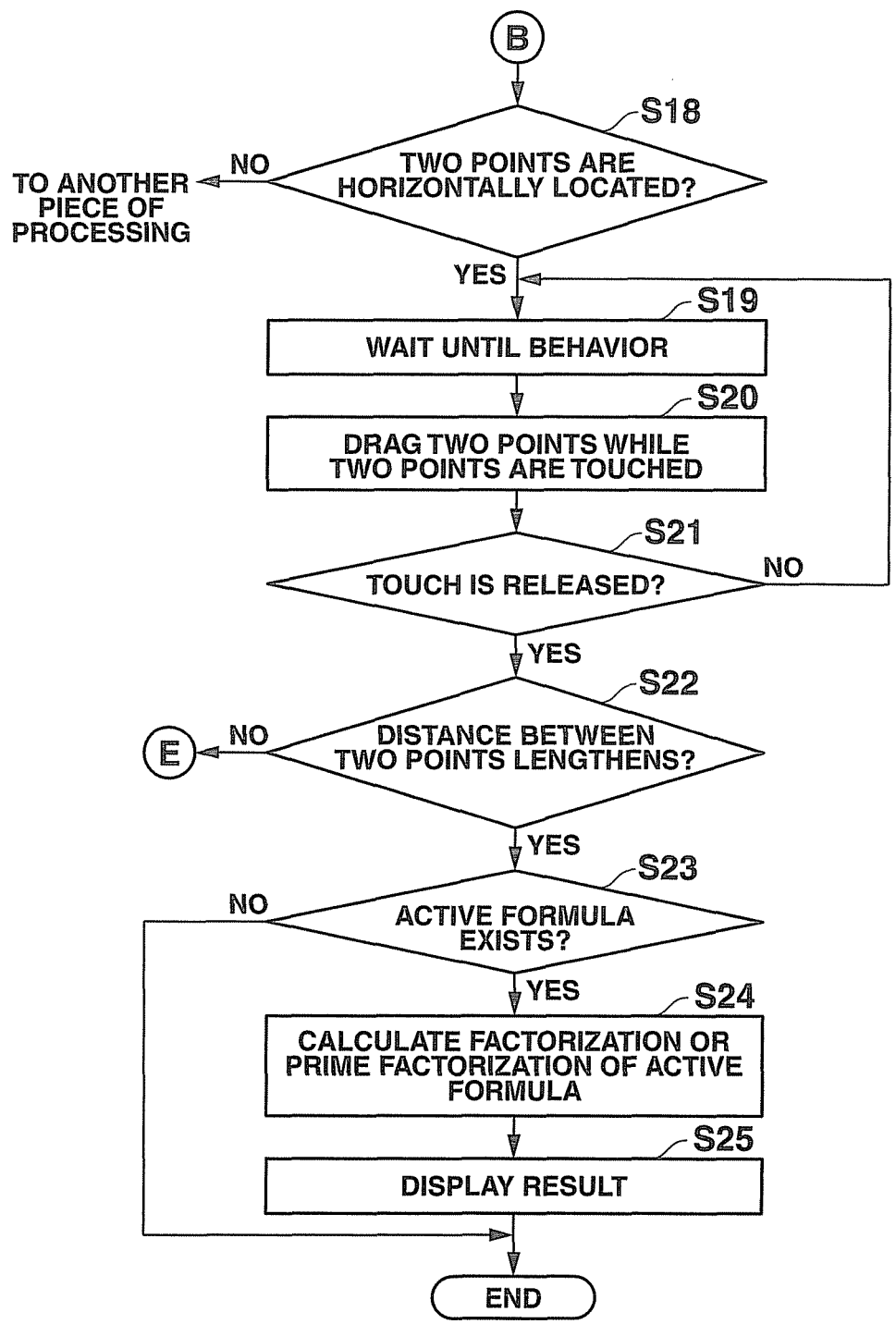
FIG. 9 is a flowchart illustrating formula transform operational processing (part 4) in which the touch screen 18 of the graph scientific calculator 10 is used.

FIG. 9 is a flowchart illustrating formula transform operational processing (part 4) in which the touch screen 18 of the graph scientific calculator 10 is used.

FIGS. 10A, 10B, 10C, and 10D illustrate a multi-touch manipulation state associated with the formula transform operational processing (part 4) of the graph scientific calculator 10 and a display state of a mathematical formula transformed by factorization according to a manipulation mode of the multi-touch manipulation state.

Figure 10A:
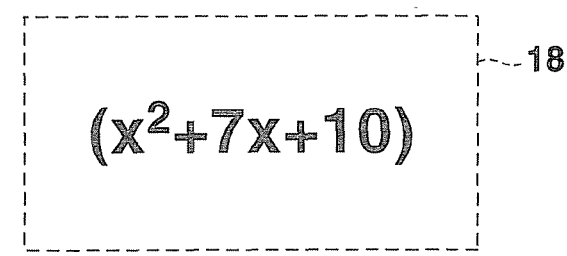
FIGS. 10A, 10B, 10C, and 10D illustrate a multi-touch manipulation state associated with the formula transform operational processing (part 4) of the graph scientific calculator 10 and a display state of a mathematical formula transformed by factorization according to a manipulation mode of the multi-touch manipulation state.
Figure 10B:
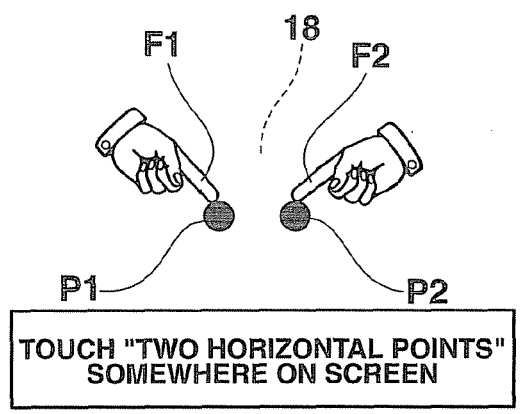

For example, as illustrated in FIG. 10A, a quadratic $[x^2+7x+10]$ is displayed on the touch screen 18 in response to the user manipulation of the key input unit 11. At this point, when the two horizontal points P1 and P2 are touched somewhere on the touch screen 18 with user's two fingers F1 and F2 as illustrated in FIG. 10B, it is determined that the two points P1 and P2 are touched (YES in Step S1) while the two points P1 and P2 are horizontally located (YES in Step S18) based on the coordinate data of each touch position stored in the touch position data memory 26g.

Figure 10C:
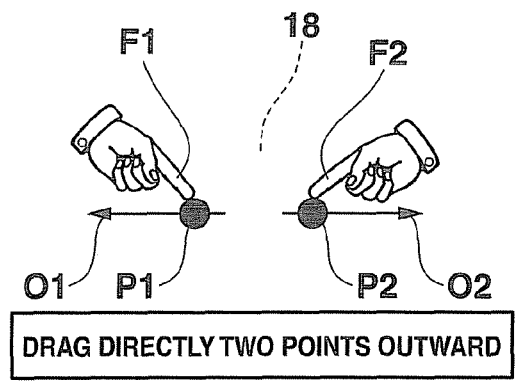

At this point, the two touch positions P1 and P2 are dragged with user's two fingers F1 and F2 in the direction in which the two points P1 and P2 move away from each other as indicated by the arrows O1 and O2 of FIG. 10C, and the two points P1 and P2 are released. After the drag behavior is recognized based on the coordinate data and locus data of each touch position stored in the touch position data memory 26g (Steps S19 and S20), it is determined that the touch manipulation is released (YES in Step S21), and that the drag manipulation in which "distance between two points lengthens" is performed (YES in Step S22).

It is determined whether the active mathematical formula exists on the touch screen 18 based on the formula data stored in the selected formula data memory 26h (Step S23).

At this point, because of the determination that the active quadratic $[x^2+7x+10]$ exists on the touch screen 18 (YES in Step S23), an operation type "factorization (prime factorization)" corresponding to a drag manipulation mode "multi touch of two horizontal points+distance between two points lengthens" is read from the drag manipulation/operation corresponding table 22c to perform the operational processing for transforming the active quadratic $[x^2+7x+10]$ by the factorization (prime factorization) (Step S24).

Figure 10D:
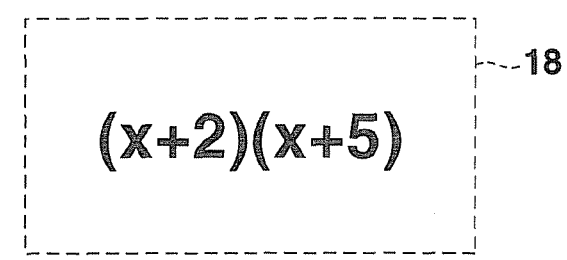

As illustrated in FIG. 10D, a mathematical formula [(x+2)(x+5)] that is transformed through the factorization (prime factorization) operational processing is displayed on the touch screen 18 (Step S25).

When the operational processing for transforming the active mathematical formula on the touch screen 18 by the "factorization (prime factorization)" cannot be performed in Step S24, an error message is displayed on the touch screen 18 (Step S25).

Therefore, on the touch screen 18 on which an arbitrary mathematical formula is displayed, the drag manipulation is outwardly performed such that the fingers F1 and F2 with which the two horizontal points P1 and P2 are multi-touched move away from each other, whereby the mathematical formula can immediately be displayed as a mathematical formula transformed by the factorization (prime factorization) and the intuitive learning can be performed.

Figure 11:
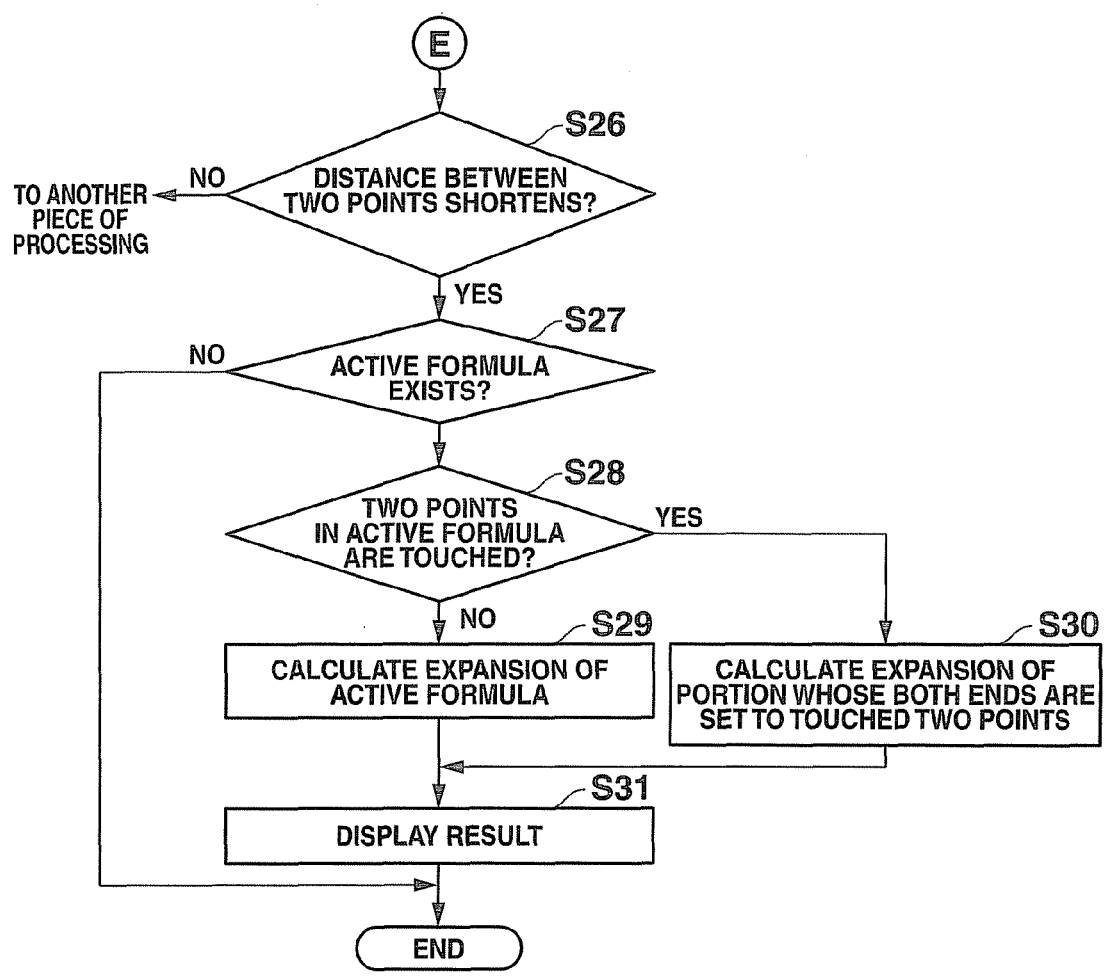
FIG. 11 is a flowchart illustrating formula transform operational processing (parts 5 and 6) in which the touch screen 18 of the graph scientific calculator 10 is used.

FIG. 11 is a flowchart illustrating formula transform operational processing (parts 5 and 6) in which the touch screen 18 of the graph scientific calculator 10 is used.

FIGS. 12A, 12B, 12C, and 12D illustrate a multi-touch manipulation state associated with the formula transform operational processing (part 5) of the graph scientific calculator 10 and a display state of a mathematical formula transformed by expansion according to a manipulation mode of the multi-touch manipulation state.

Figure 12A:
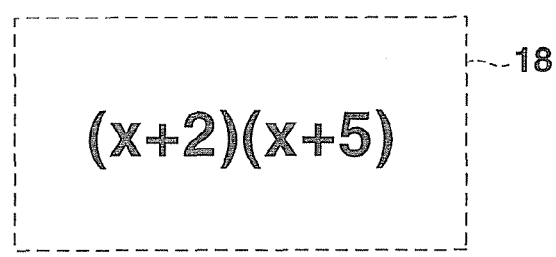
FIGS. 12A, 12B, 12C, and 12D illustrate a multi-touch manipulation state associated with the formula transform operational processing (part 5) of the graph scientific calculator 10 and a display state of a mathematical formula transformed by expansion according to a manipulation mode of the multi-touch manipulation state.
Figure 12B:
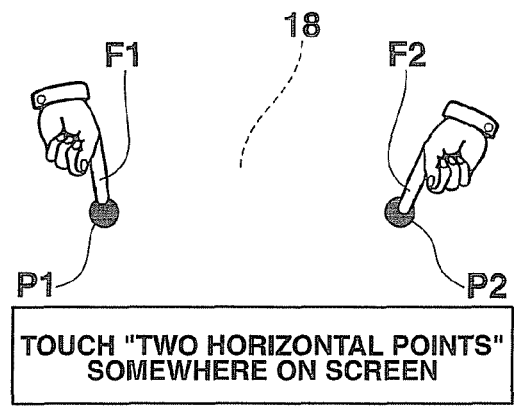

For example, as illustrated in FIG. 12A, the mathematical formula [(x+2)(x+5)] is displayed on the touch screen 18 in response to the user manipulation of the key input unit 11. At this point, as illustrated in FIG. 12B, the two horizontal points P1 and P2 are touched somewhere on the touch screen 18 with user's two fingers F1 and F2 (YES in Step S1→YES in Step S18). Then, the two touch positions P1 and P2 are dragged in the direction in which the two points P1 and P2 come close to each other as indicated by the arrows I1 and I2 of FIG. 12C, and the two points P1 and P2 are released.

After the drag behavior is recognized based on the coordinate data and locus data of each touch position stored in the touch position data memory 26g (Steps S19 and S20), it is determined that the touch manipulation is released (YES in Step S21), and that the drag manipulation in which "distance between two points shortens" is performed (YES in Step S26).

At this point, because of the determination that the active mathematical formula [(x+2)(x+5)] exists on the touch screen 18 (YES in Step S27), it is determined whether the two touch positions P1 and P2 are detected in the active mathematical formula [(x+2)(x+5)] (Step S28).

Figure 12C:
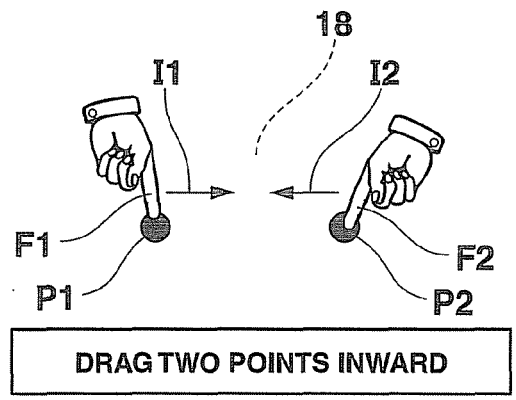

At this point, as illustrated in FIGS. 12B and 12C, because of the determination that the two touch positions P1 and P2 are not detected in the active mathematical formula [(x+2)(x+5)] (NO in Step S28), an operation type "expansion" corresponding to the drag manipulation mode "multi touch of two horizontal points+distance between two points shortens" is read from the drag manipulation/operation corresponding table 22c to perform the operational processing for transforming the active mathematical formula [(x+2)(x+5)] by the expansion (Step S29).

Figure 12D:
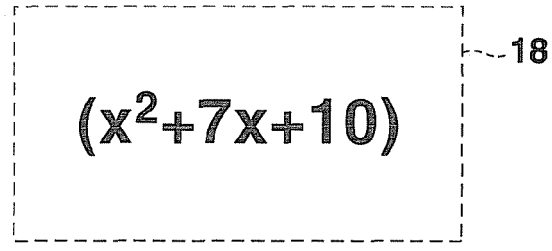

As illustrated in FIG. 12D, the quadratic [$x^2$+7x+10] that is transformed while expanded through the expansion operational processing is displayed on the touch screen 18 (Step S31).

When the operational processing for transforming the active mathematical formula on the touch screen 18 by the "expansion" cannot be performed in Step S29, an error message is displayed on the touch screen 18 (Step S31).

In this manner, on the touch screen 18 on which an arbitrary mathematical formula is displayed, the drag manipulation is inwardly performed such that the fingers F1 and F2 with which the two horizontal points P1 and P2 are multi-touched are brought close to each other, whereby the mathematical formula can immediately be displayed as a mathematical formula transformed while expanded, and the intuitive learning can be performed.

Accordingly, as illustrated in FIGS. 9 to 12D, for the pair of touch manipulation modes, that is, the drag manipulation in which the two horizontal points multi-touched with the fingers are dragged outward so as to move away from each other and the drag manipulation in which the two horizontal points multi-touched with the fingers are dragged inward so as to come close to each other, the pieces of operational processing such as the factorization and the formula expansion which serve as the pathways opposite to each other are performed, so that the intuitive learning can be performed.

FIGS. 13A, 13B, 13C, and 13D illustrate a multi-touch manipulation state associated with the formula transform operational processing (part 6) of the graph scientific calculator 10 and a display state of a mathematical formula transformed by the expansion according to a manipulation mode of the multi-touch manipulation state.

Figure 13A:
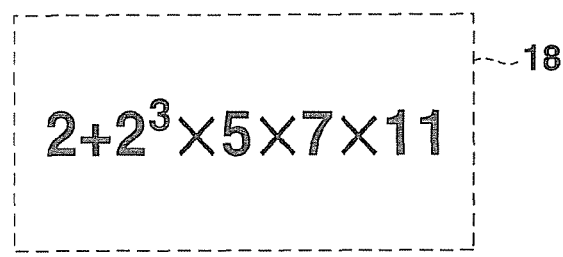
FIGS. 13A, 13B, 13C, and 13D illustrate a multi-touch manipulation state associated with the formula transform operational processing (part 6) of the graph scientific calculator 10 and a display state of a mathematical formula transformed by expansion according to a manipulation mode of the multi-touch manipulation state.
Figure 13B:
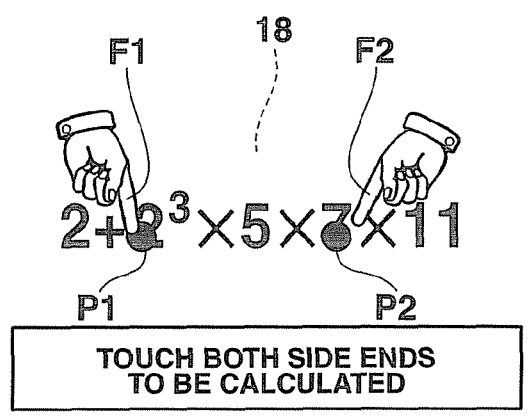

For example, as illustrated in FIG. 13A, a mathematical formula [2+$2^3$×5×7×11] is displayed on the touch screen 18 in response to the user manipulation of the key input unit 11. At this point, as illustrated in FIG. 13B, the two points P1 and P2 at both ends of a mathematical formula portion [$2^3$×5×7] to be expanded in the mathematical formula [2+$2^3$×5×7×11] are touched with user's two fingers F1 and F2 (YES in Step S1→YES in Step S18). Then, the two touch positions P1 and P2 are dragged in the direction in which the two points P1 and P2 come close to each other as indicated by the arrows I1 and I2 of FIG. 13C, and the two points P1 and P2 are released.

After the drag behavior is recognized based on the coordinate data and locus data of each touch position stored in the touch position data memory 26g (Steps S19 and S20), it is determined that the touch manipulation is released (YES in Step S21), and that the drag manipulation in which "distance between two points shortens" is performed (YES in Step S26).

Figure 13C:
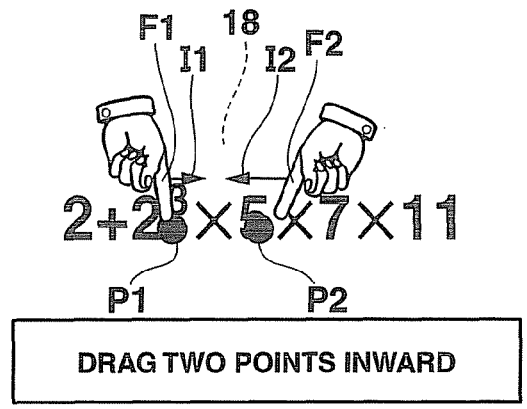

At this point, when it is determined that the active mathematical formula [2+$2^3$×5×7×11] exists on the touch screen 18 (YES in Step S27), it is determined that the two touch positions P1 and P2 are detected in the active mathematical formula [2+$2^3$×5×7×11] as illustrated in FIGS. 13B and 13C (YES in Step S28).

The operation type "expansion" corresponding to the drag manipulation mode "multi touch of two horizontal points+distance between two points shortens" is read from the drag manipulation/operation corresponding table 22c to perform the operational processing for transforming the mathematical formula portion [$2^3$×5×7] having the two touch positions P1 and P2 at both ends by the expansion (Step S30).

Figure 13D:
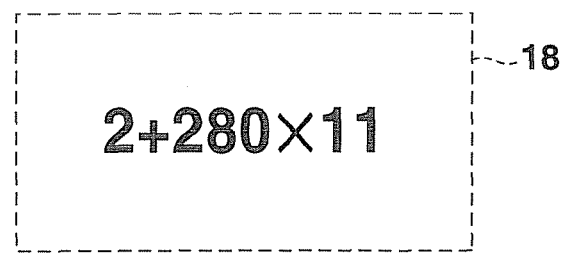

As illustrated in FIG. 13D, a mathematical formula [2+280×11] that is transformed while expanded through the expansion operational processing is displayed on the touch screen 18 (Step S31).

Therefore, on the touch screen 18 on which an arbitrary mathematical formula is displayed, the drag manipulation is inwardly performed such that the two points P1 and P2 are brought close to each other, while the two points P1 and P2 at both ends of the mathematical formula portion which should be expanded in the mathematical formula are multi-touched, whereby the mathematical formula portion can immediately be displayed as a mathematical formula transformed while expanded, and the intuitive learning can be performed.

Figure 14:
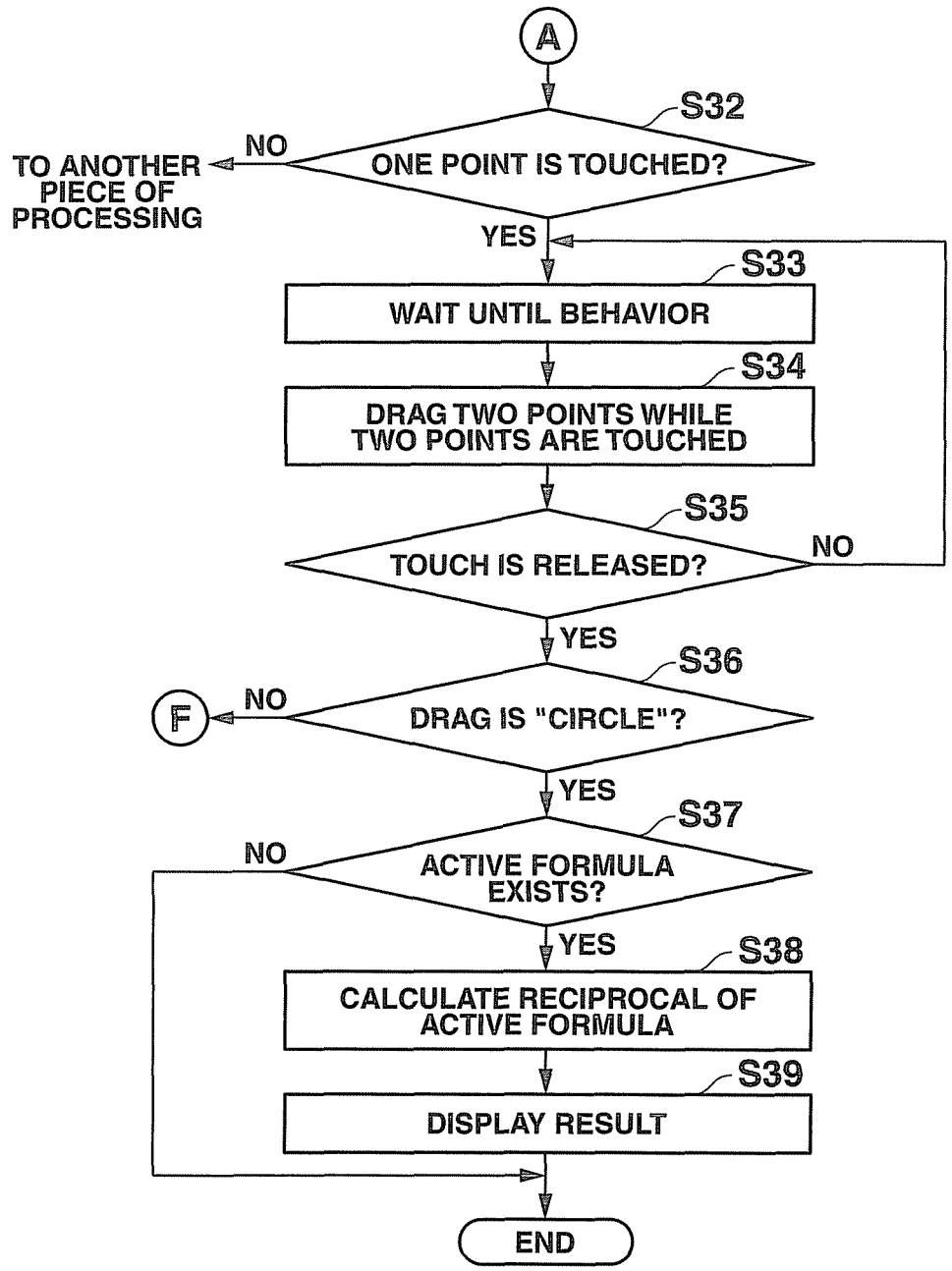
FIG. 14 is a flowchart illustrating formula transform operational processing (part 7) in which the touch screen 18 of the graph scientific calculator 10 is used.

FIG. 14 is a flowchart illustrating formula transform operational processing (part 7) in which the touch screen 18 of the graph scientific calculator 10 is used.

FIGS. 15A, 15B, 15C, and 15D illustrate a single-touch manipulation state associated with the formula transform operational processing (part 7) of the graph scientific calculator 10 and a display state of a mathematical formula reciprocal-transformed according to a manipulation mode of the single-touch manipulation state.

Figure 15A:
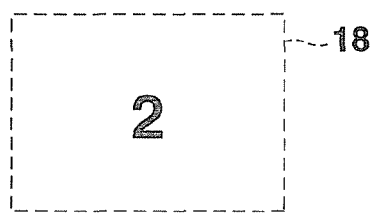
FIGS. 15A, 15B, 15C, and 15D illustrate a single-touch manipulation state associated with the formula transform operational processing (part 7) of the graph scientific calculator 10 and a display state of a mathematical formula reciprocal-transformed according to a manipulation mode of the single-touch manipulation state.
Figure 15B:
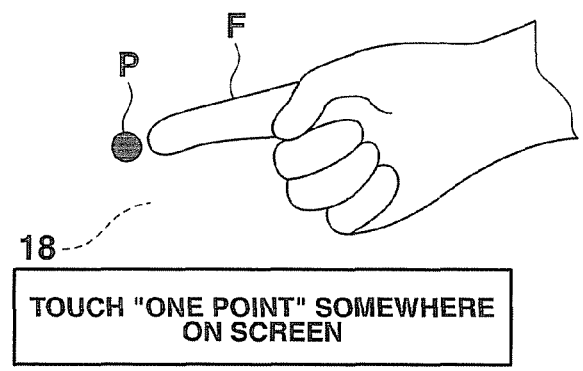

For example, as illustrated in FIG. 15A, the decimal formula [2] is displayed on the touch screen 18 in response to the user manipulation of the key input unit 11. At this point, when a point P is touched somewhere on the touch screen 18 with user's finger F as illustrated in FIG. 15B, it is determined that the point P is touched based on the coordinate data of the touch position stored in the touch position data memory 26g (YES in Step S32).

Figure 15C:
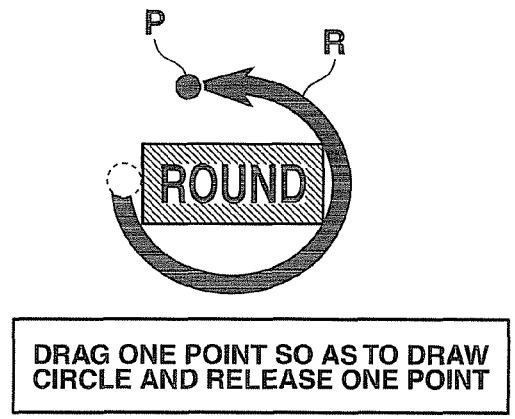

When the touch position P is dragged with the user's finger F such that a circle is drawn on the touch screen 18 as indicated by an arrow R of FIG. 15C, after the drag behavior is recognized based on the coordinate data and locus data of the touch position stored in the touch position data memory 26g (Steps S33 and S34), it is determined that the touch manipulation is released (YES in Step S35), and that a drag manipulation "circle" is performed (YES in Step S36).

It is determined whether the active mathematical formula exists on the touch screen 18 based on the formula data stored in the selected formula data memory 26h (Step S37).

At this point, because of the determination that the active formula [2] exists on the touch screen 18 (YES in Step S37), an operation type "reciprocal" corresponding to a drag manipulation mode "single touch+circle" is read from the drag manipulation/operation corresponding table 22c to perform the operational processing for transforming the active formula [2] into the reciprocal (Step S38).

Figure 15D:
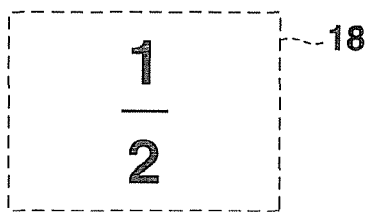

Therefore, as illustrated in FIG. 15D, the fraction formula [1/2] transformed through the reciprocal operational processing is displayed on the touch screen 18 (Step S39).

When the operational processing for transforming the active mathematical formula on the touch screen 18 into the "reciprocal" cannot be performed in Step S38, an error message is displayed on the touch screen 18 (Step S39).

In this manner, on the touch screen 18 on which an arbitrary mathematical formula is displayed, the drag manipulation is performed such that the finger F with which the point P is touched draws the circle, whereby the mathematical formula can immediately be displayed as a reciprocal-transformed mathematical formula to perform the intuitive learning.

Figure 16:
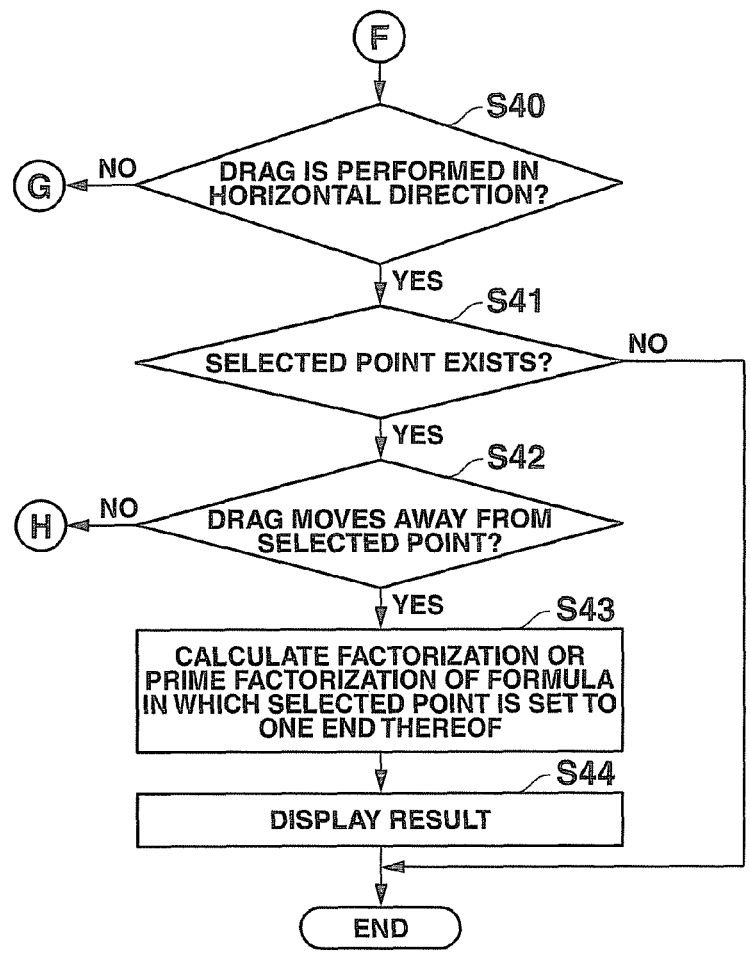
FIG. 16 is a flowchart illustrating formula transform operational processing (part 8) in which the touch screen 18 of the graph scientific calculator 10 is used.

FIG. 16 is a flowchart illustrating formula transform operational processing (part 8) in which the touch screen 18 of the graph scientific calculator 10 is used.

Figure 17:
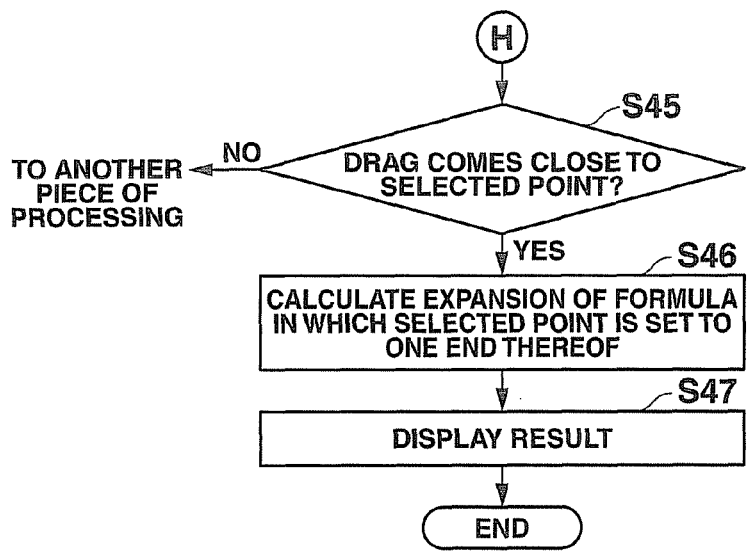
FIG. 17 is a flowchart illustrating formula transform operational processing (part 9) in which the touch screen 18 of the graph scientific calculator 10 is used.

FIG. 17 is a flowchart illustrating formula transform operational processing (part 9) in which the touch screen 18 of the graph scientific calculator 10 is used.

FIGS. 18A, 18B, 18C, and 18D illustrate a single-touch manipulation state associated with the formula transform operational processing (part 8) of the graph scientific calculator 10 and a display state of a mathematical formula transformed by factorization (prime factorization) according to a manipulation mode of the single-touch manipulation state.

FIGS. 19A, 19B, 19C, and 19D illustrate a single-touch manipulation state associated with the formula transform operational processing (part 9) of the graph scientific calculator 10 and a display state of a mathematical formula transformed by the expansion according to a manipulation mode of the single-touch manipulation state.

Figure 18A:
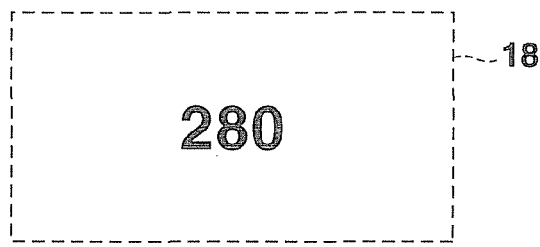
FIGS. 18A, 18B, 18C, and 18D illustrate a single-touch manipulation state associated with the formula transform operational processing (part 8) of the graph scientific calculator 10 and a display state of a mathematical formula transformed by factorization (prime factorization) according to a manipulation mode of the single-touch manipulation state.
Figure 18B:
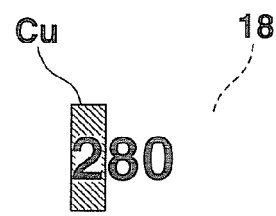

For example, while a mathematical formula [280] is displayed on the touch screen 18 in response to the user manipulation of the key input unit 11 as illustrated in FIG. 18A, a starting point [2] to which the factorization (prime factorization) should be performed is touched in the mathematical formula [280] to display a cursor Cu as illustrated in FIG. 18B.

Figure 18C:
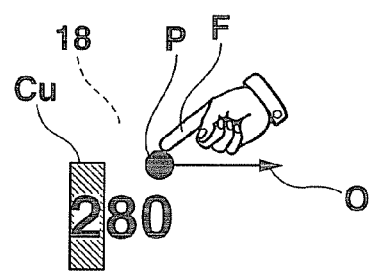

As illustrated in FIG. 18C, after the point P is touched somewhere on the touch screen 18 with user's finger F (YES in Step S32), the touch position P is dragged along the mathematical formula in the opposite direction to the selected display position (starting point [2] in mathematical formula) of the cursor Cu as indicated by an arrow O of FIG. 18C, and the touch position P is released.

After the drag behavior is recognized based on the coordinate data and locus data of the touch position stored in the touch position data memory 26g (Steps S33 and S34), it is determined that the touch manipulation is released (YES in Step S35), that the current drag manipulation is horizontally performed (YES in Step S40), and that the starting point [2] is selected in the mathematical formula [280] by the cursor Cu (YES in Step S41).

It is determined that a drag manipulation in which "touch position P moves away from selected point" at which the cursor Cu is displayed is performed (YES in Step S42).

An operation type "factorization (prime factorization)" corresponding to a drag manipulation mode "selected point+single-touch position moves away" is read from the drag manipulation/operation corresponding table 22c to perform the operational processing for transforming the mathematical formula [280] having the selected starting point [2] as one end by the factorization (prime factorization) (Step S43).

Figure 18D:
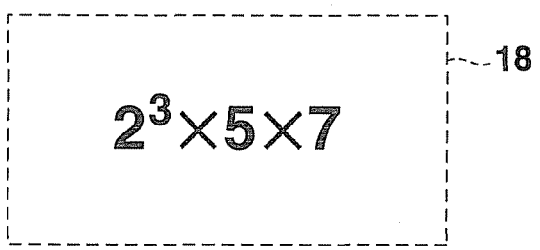

As illustrated in FIG. 18D, a mathematical formula [$2^3 \times 5 \times 7$] transformed through the factorization (prime factorization) operational processing is displayed on the touch screen 18 (Step S44).

Therefore, on the touch screen 18 on which an arbitrary mathematical formula is displayed, after the desired starting point is selected in the mathematical formula, the drag manipulation is performed in the direction in which the finger F with which the touch position P is single-touched moves away from the selected starting point, whereby the mathematical formula portion from the starting point selected in the mathematical formula can immediately be displayed as a mathematical formula transformed by the factorization (prime factorization), and the intuitive learning can be performed.

Figure 19A:
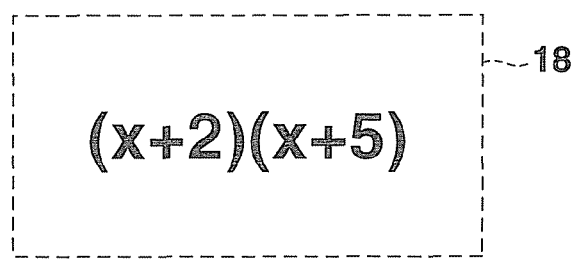
FIGS. 19A, 19B, 19C, and 19D illustrate a single-touch manipulation state associated with the formula transform operational processing (part 9) of the graph scientific calculator 10 and a display state of a mathematical formula transformed by expansion according to a manipulation mode of the single-touch manipulation state.
Figure 19B:
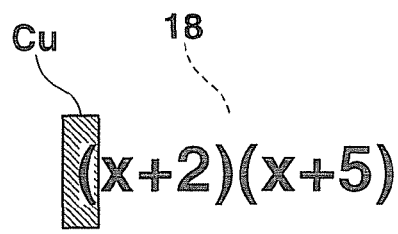

For example, while the mathematical formula [(x+2)(x+5)] is displayed on the touch screen 18 in response to the user manipulation of the key input unit 11 as illustrated in FIG. 19A, a starting point [(] to which the expansion should be performed is touched in the mathematical formula [(x+2)(x+5)] to display the cursor Cu as illustrated in FIG. 19B.

Figure 19C:
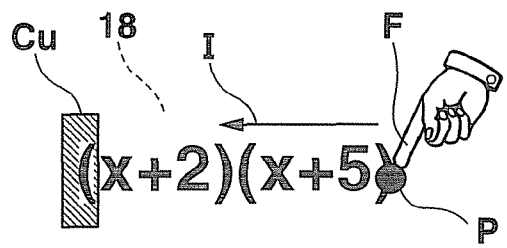

As illustrated in FIG. 19C, after the point P is touched somewhere on the touch screen 18 with user's finger F (YES in Step S32), the touch position P is dragged along the mathematical formula in the direction of the selected display position (starting point [(] in mathematical formula) of the cursor Cu as indicated by an arrow I of FIG. 19C, and the touch position P is released.

After the drag behavior is recognized based on the coordinate data and locus data of the touch position stored in the touch position data memory 26g (Steps S33 and S34), it is determined that the touch manipulation is released (YES in Step S35), that the current drag manipulation is horizontally performed (YES in Step S40), and that the starting point [(] is selected in the mathematical formula [(x+2)(x+5)] by the cursor Cu (YES in Step S41).

It is determined that a drag manipulation in which "touch position P comes close to selected point" at which the cursor Cu is displayed is performed (YES in Step S45).

An operation type "expansion" corresponding to a drag manipulation mode "selected point+single-touch position comes close" is read from the drag manipulation/operation corresponding table 22c to perform the operational processing for transforming the mathematical formula [(x+2)(x+5)] having the starting point [(] as one end by the expansion (Step S46).

Figure 19D:
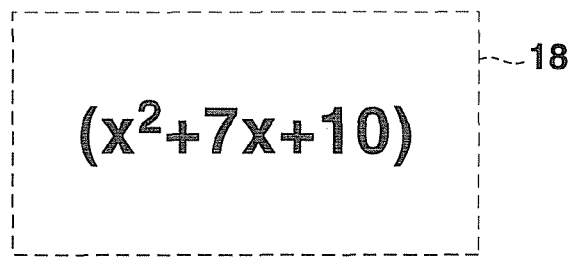

As illustrated in FIG. 19D, the mathematical formula [$x^2+7x+10$] transformed through the expansion operational processing is displayed on the touch screen 18 (Step S47).

Therefore, on the touch screen 18 on which an arbitrary mathematical formula is displayed, after the desired starting point is selected in the mathematical formula, the drag manipulation is performed in the direction in which the finger F with which the touch position P is single-touched comes close to the selected starting point, whereby the formula portion having the starting point selected in the mathematical formula as one end can immediately be displayed as a mathematical formula transformed by the expansion, and the intuitive learning can be performed.

Figure 20:
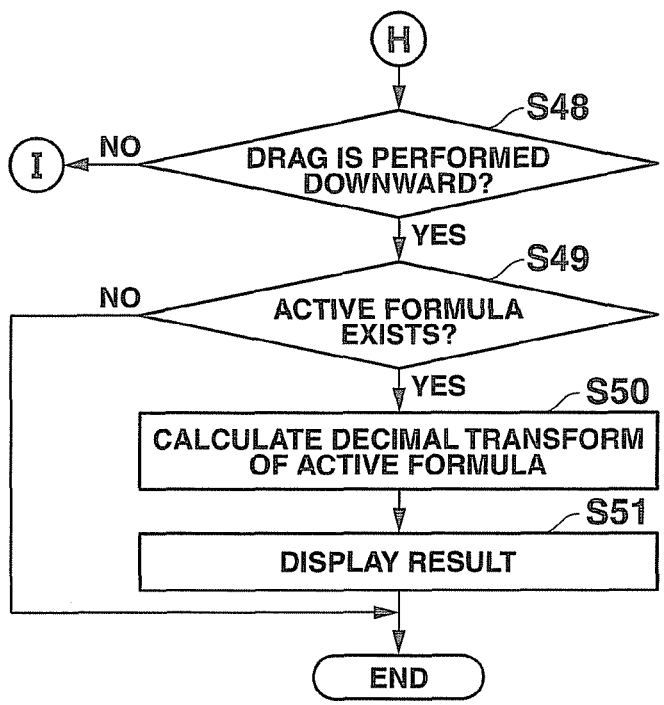
FIG. 20 is a flowchart illustrating formula transform operational processing (part 10) in which the touch screen 18 of the graph scientific calculator 10 is used.

FIG. 20 is a flowchart illustrating formula transform operational processing (part 10) in which the touch screen 18 of the graph scientific calculator 10 is used.

Figure 21:
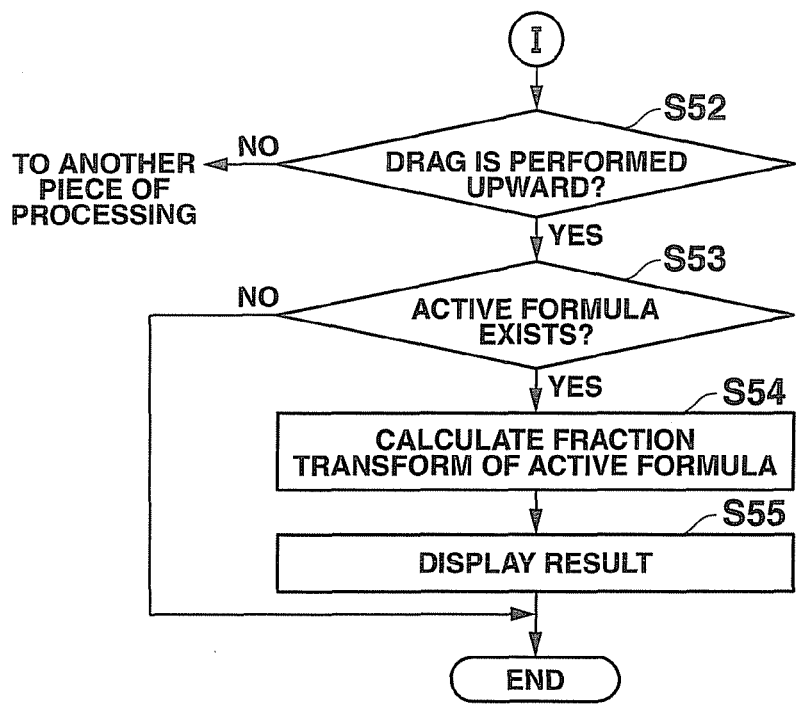
FIG. 21 is a flowchart illustrating formula transform operational processing (part 11) in which the touch screen 18 of the graph scientific calculator 10 is used.

FIG. 21 is a flowchart illustrating formula transform operational processing (part 11) in which the touch screen 18 of the graph scientific calculator 10 is used.

Figure 22A:
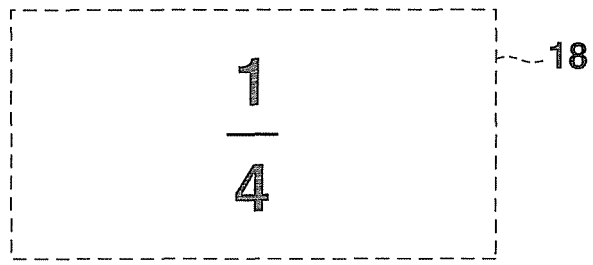
FIGS. 22A, 22B, and 22C illustrate a single-touch manipulation state associated with the formula transform operational processing (part 10) of the graph scientific calculator 10 and a display state of a mathematical formula decimal-transformed according to a manipulation mode of the single-touch manipulation state.
Figure 22B:
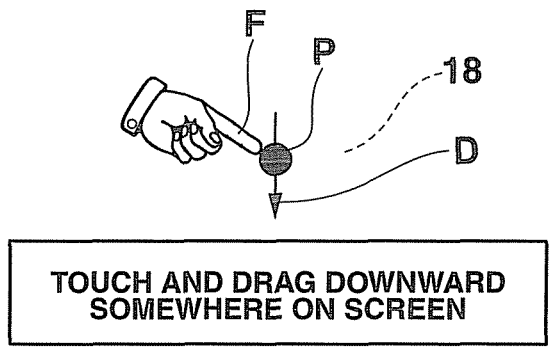
Figure 22C:

FIGS. 22A, 22B, and 22C illustrate a single-touch manipulation state associated with the formula transform operational processing (part 10) of the graph scientific calculator 10 and a display state of a mathematical formula decimal-transformed according to a manipulation mode of the single-touch manipulation state.

Figure 23B:
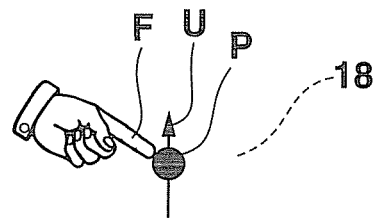

FIGS. 23A, 23B, and 23C illustrate a single-touch manipulation state associated with the formula transform operational processing (part 11) of the graph scientific calculator 10 and a display state of a mathematical formula fraction-transformed according to a manipulation mode of the single-touch manipulation state.

For example, while the fraction formula [1/4] is displayed on the touch screen 18 in response to the user manipulation of the key input unit 11 as illustrated in FIG. 22A, the point P is touched with user's finger F somewhere on the touch screen 18 as illustrated in FIG. 22B (YES in Step S32). Then the touch position P is dragged downward on the touch screen 18 as indicated by an arrow D of FIG. 22B, and the touch position P is released.

After the drag behavior is recognized based on the coordinate data and locus data of the touch position stored in the touch position data memory 26g (Steps S33 and S34), it is determined that the touch manipulation is released (YES in Step S35), and that a drag manipulation in "downward direction" is performed (YES in Step S48).

Because of the determination that the active fraction formula [1/4] exists on the touch screen 18 (YES in Step S49), an operation type "decimal transform" corresponding to a drag manipulation mode "single touch+downward direction" is read from the drag manipulation/operation corresponding table 22c to perform the operational processing for transforming the active fraction formula [1/4] into the decimal (Step S50).

As illustrated in FIG. 22C, the decimal formula [0.25] transformed into the decimal through the decimal-transform operational processing is displayed on the touch screen 18 (Step S51).

In this manner, on the touch screen 18 on which an arbitrary mathematical formula is displayed, the drag manipulation is performed such that the finger F with which the touch position P is touched moves downward, whereby the mathematical formula portion can immediately be displayed as a decimal-transformed mathematical formula to perform the intuitive learning.

For example, while the decimal formula [0.25] is displayed on the touch screen 18 in response to the user manipulation of the key input unit 11 as illustrated in FIG. 23A, the point P is touched with user's finger F somewhere on the touch screen 18 as illustrated in FIG. 23B (YES in Step S32). Then the touch position P is dragged upward on the touch screen 18 as indicated by an arrow U of FIG. 23B, and the touch position P is released.

After the drag behavior is recognized based on the coordinate data and locus data of the touch position stored in the touch position data memory 26g (Steps S33 and S34), it is determined that the touch manipulation is released (YES in Step S35), and that a drag manipulation in "upward direction" is performed (YES in Step S52).

Because of the determination that the active decimal formula [0.25] exists on the touch screen 18 (YES in Step S53), an operation type "fraction transform" corresponding to a drag manipulation mode "single touch+upward direction" is read from the drag manipulation/operation corresponding table 22c to perform the operational processing for transforming the active decimal formula [0.25] into the fraction (Step S54).

As illustrated in FIG. 23C, the fraction formula [1/4] transformed into the fraction through the fraction-transform operational processing is displayed on the touch screen 18 (Step S55).

Therefore, on the touch screen 18 on which an arbitrary mathematical formula is displayed, the drag manipulation is performed such that the finger F with which the touch position P is touched moves upward, whereby the mathematical formula portion can immediately be displayed as a fraction-transformed mathematical formula to perform the intuitive learning.

Accordingly, according to the formula transform operation function of the graph scientific calculator 10 having the above-described configuration, on the touch screen 18 on which an arbitrary mathematical formula is displayed, the multi touch or the single touch is performed by the user manipulation, and the drag manipulation of the touch position is performed in the intuitive mode corresponding to contents of the mathematical formula transform. As a result, the drag manipulation mode including the touch position and the locus of the touch position of the user manipulation is determined, and the operation type previously set in the drag manipulation/operation corresponding table 22c is read according to the drag manipulation mode. Then the displayed mathematical formula is transformed through the operational processing corresponding to the drag manipulation mode, and the transformed mathematical formula is displayed on the touch screen 18.

Therefore, the user does not have to memorize such complicated manipulations as the selection of the item from the menu and the command input, and the displayed mathematical formula can be displayed while transformed into the mathematical formula corresponding to the user's intuitive manipulation, so that even junior students can effectively perform the learning.

(Graphic Deformation Operation Function)

Figure 24:
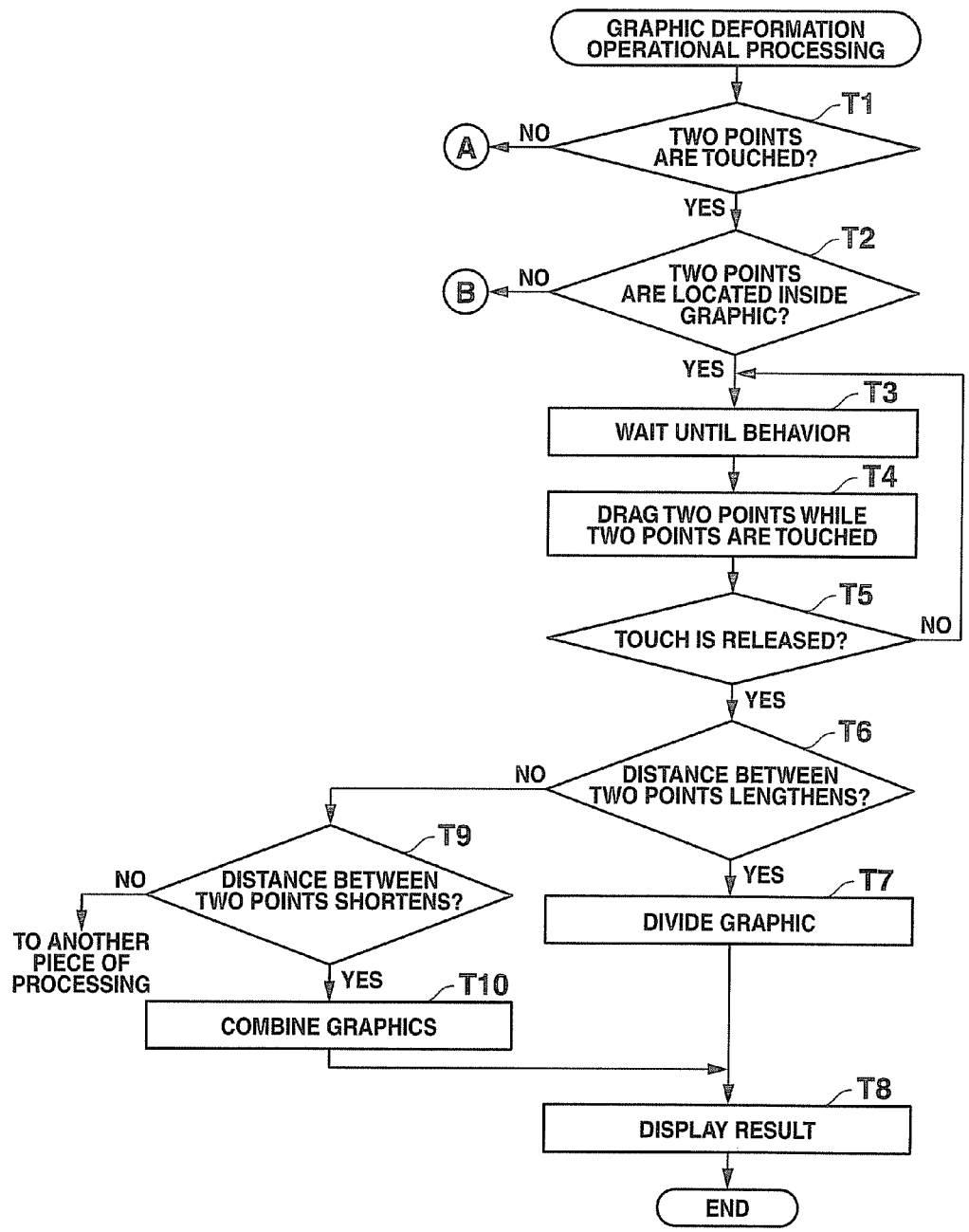
FIG. 24 is a flowchart illustrating graphic deformation operational processing (part 1) in which the touch screen 18 of the graph scientific calculator 10 is used.

FIG. 24 is a flowchart illustrating graphic deformation operational processing (part 1) in which the touch screen 18 of the graph scientific calculator 10 is used.

Figure 25A:
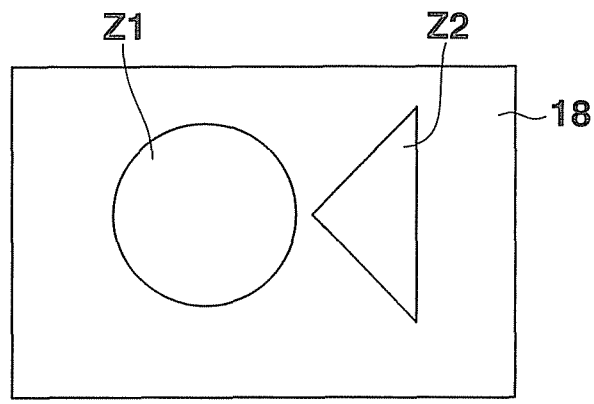
FIGS. 25A, 25B, and 25C illustrate a multi-touch manipulation state associated with the graphic deformation operational processing (part 1) of the graph scientific calculator 10 and a display state of graphics divided and deformed according to a manipulation mode of the multi-touch manipulation state.
Figure 25B:
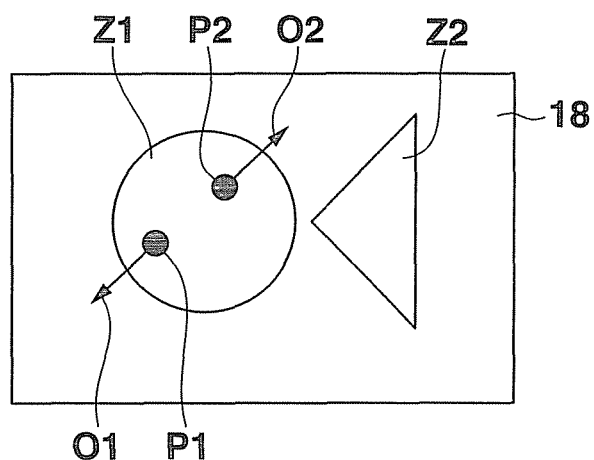
Figure 25C:
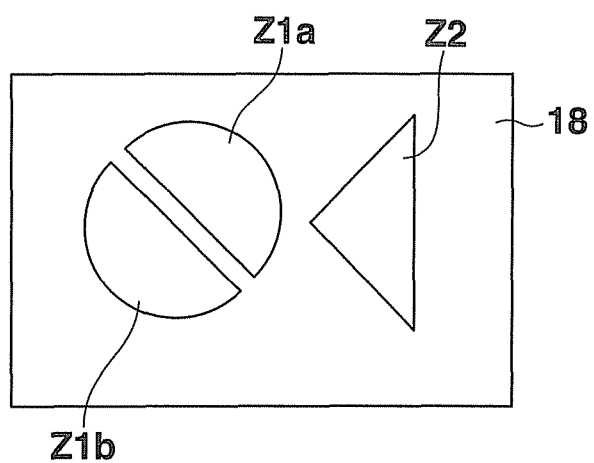

FIGS. 25A, 25B, and 25C illustrate a multi-touch manipulation state associated with the graphic deformation operational processing (part 1) of the graph scientific calculator 10 and a display state of graphics divided and deformed according to a manipulation mode of the multi-touch manipulation state.

For example, a graphic drawing program 22b is started in response to the user manipulation of the key input unit 11 or touch screen 18, and graphics of a circle Z1 and an isosceles triangle Z2 are displayed on the touch screen 18 as illustrated in FIG. 25A. At this point, when the user touches the two points P1 and P2 inside a region of the circular graphic Z1 as illustrated in FIG. 25B, it is determined that the two points P1 and P2 are touched based on the coordinate data of each touch position stored in the touch position data memory 26g (YES in Step T1), and that the two points P1 and P2 are located inside the circular graphic Z1 (YES in Step T2).

When the user releases the two touch positions P1 and P2 after dragging the touch positions P1 and P2 in the direction in which the touch positions P1 and P2 move away from each other in the circular graphic Z1 as indicated by the arrows O1 and O2 of FIG. 25B, the drag behavior is recognized based on the coordinate data and locus data of each touch position stored in the touch position data memory 26g (Steps T3 and T4), after which it is determined that the touch manipulation is released (YES in Step T5), and that the drag manipulation in which "distance between two points lengthens" is performed (YES in Step T6).

A drawing operation type "division" corresponding to a drag manipulation mode "multi touch in identical graphic+ distance between two points lengthens" is read from the drag manipulation/operation corresponding table 22c to perform the deformation operational processing for dividing the circular graphic Z1 including the two touch positions P1 and P2 into halves in the direction corresponding to the drag manipulation (Step T7).

As illustrated in FIG. 25C, semicircular graphics Z1a and Z1b which are deformed through the operational processing for dividing the circular graphic Z1 are displayed on the touch screen 18 (Step T8).

When the operational processing for "dividing" the graphic on the touch screen 18 by the drag manipulation cannot be performed in Step T7, an error message is displayed on the touch screen 18 (Step T9).

Therefore, on the touch screen 18 on which the arbitrary graphic is displayed, the two points P1 and P2 are multi-touched inside the graphic Zn to be deformed, and the drag manipulation is performed in the direction in which the two touch positions P1 and P2 move away from each other, whereby the graphic of the deformation target can immediately be displayed while divided into two, and the intuitive learning can be performed.

On the other hand, as illustrated in FIG. 25C, while the divided semicircular graphics Z1a and Z1b are displayed, the inside of each of the semicircular graphics Z1a and Z1b is touched, and the drag manipulation is performed in the direction in which the distance between the two touch positions shortens, and the semicircular graphics Z1a and Z1b are released (YES in Steps T1 to T5).

Because of the determination that the distance between the multi-touched two positions shortens (YES in Step T9), a drawing operation type "combination" corresponding to the drag manipulation mode "multi touch of graphics+distance between two positions shortens" is read from the drag manipulation/operation corresponding table 22c to perform the operational processing for combining the semicircular graphics Z1a and Z1b (Step T10).

The original circular graphic Z1 which is formed by combining the semicircular graphics Z1a and Z1b is displayed on the touch screen 18 (Step T8).

Therefore, on the touch screen 18 on which an arbitrary graphic is displayed, the insides of the plural graphics Zn . . . to be deformed are multi-touched, and the drag manipulation is performed in the direction in which the touch positions Pn . . . come close to each other, whereby one graphic into which the graphics of the deformation targets are combined can immediately be displayed, and the intuitive learning can be performed.

Figure 26:
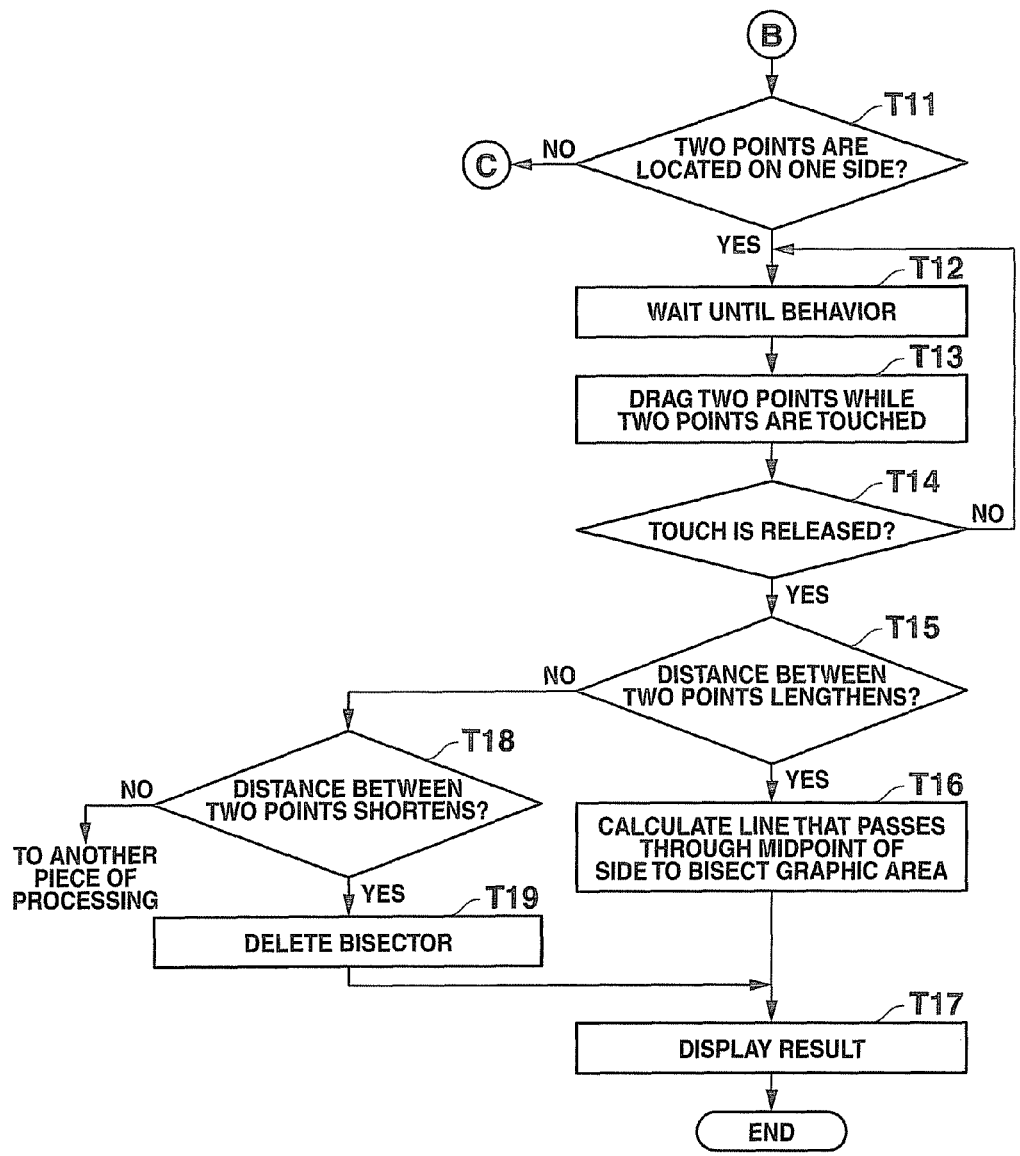
FIG. 26 is a flowchart illustrating graphic deformation operational processing (part 2) in which the touch screen 18 of the graph scientific calculator 10 is used.

FIG. 26 is a flowchart illustrating graphic deformation operational processing (part 2) in which the touch screen 18 of the graph scientific calculator 10 is used.

FIGS. 27A, 27B, 27C, and 27D illustrate a multi-touch manipulation state associated with the graphic deformation operational processing (part 2) of the graph scientific calculator 10 and a display state of a graphic bisection-deformed according to a manipulation mode of the multi-touch manipulation state.

Figure 27A:
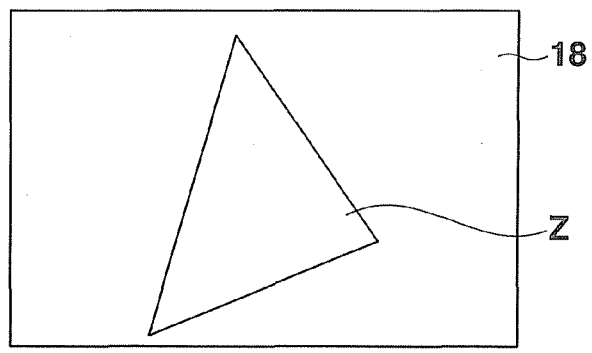
FIGS. 27A, 27B, 27C, and 27D illustrate a multi-touch manipulation state associated with the graphic deformation operational processing (part 2) of the graph scientific calculator 10 and a display state of a graphic bisection-deformed according to a manipulation mode of the multi-touch manipulation state.
Figure 27B:
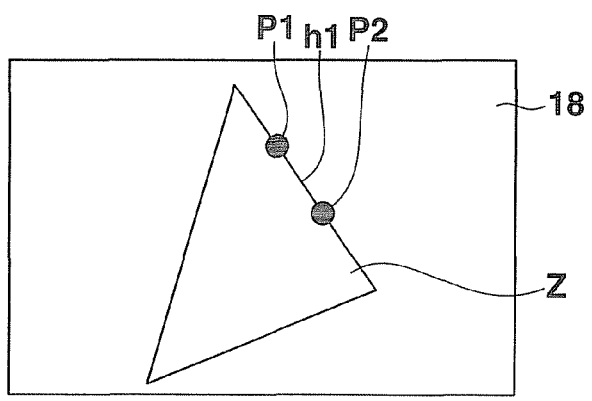

For example, the graphic drawing program 22b is started in response to the user manipulation, and a triangle Z is displayed on the touch screen 18 as illustrated in FIG. 27A. At this point, when the two points P1 and P2 are touched on an arbitrary side h1 of the triangle Z as illustrated in FIG. 27B, it is determined that the two points P1 and P2 are touched based on the coordinate data of each touch position stored in the touch position data memory 26g (YES in Step T1), and that the two points P1 and P2 are located on the side h1 of the triangle Z (YES in Step T11).

Figure 27C:
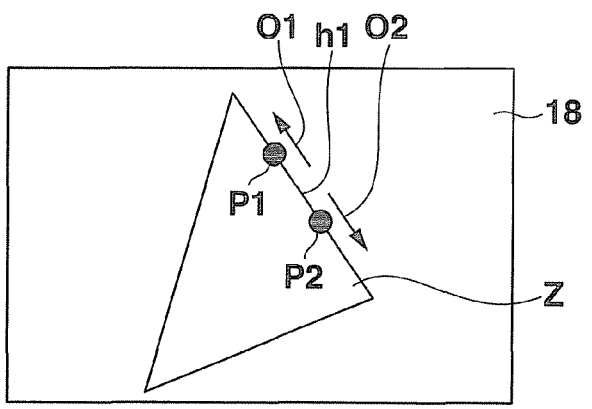

When the user releases the two touch positions P1 and P2 after dragging the touch positions P1 and P2 in the direction in which the touch positions P1 and P2 move away from each other on the side h1 as indicated by the arrows O1 and O2 of FIG. 27C, the drag behavior is recognized based on the coordinate data and locus data of each touch position stored in the touch position data memory 26g (Steps T12 and T13), after which it is determined that the touch manipulation is released (YES in Step T14), and that the drag manipulation in which "distance between two points lengthens" is performed (YES in Step T15).

A drawing operation type "area bisection" corresponding to a drag manipulation mode "multi touch on one side+distance between two points lengthens" is read from the drag manipulation/operation corresponding table 22c to perform the operational processing for obtaining a midpoint C of the side h1 on which the touch positions P1 and P2 exist and a line Q which passes through the midpoint C to bisect the triangle Z (Step T16).

Figure 27D:
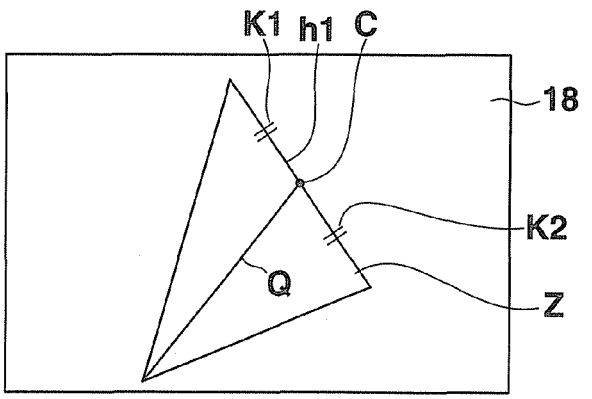

As illustrated in FIG. 27D, the midpoint C on the side h1 of the triangle Z and the bisector Q passing through the midpoint C, which are obtained, through the "area bisection" operational processing, are displayed on the touch screen 18 along with bisection symbols K1 and K2 (Step T17).

Therefore, on the touch screen 18 on which the arbitrary graphic is displayed, the two points P1 and P2 are multi-touched on the side hn of the graphic Zn to be deformed, and the drag manipulation is performed in the direction in which the two touch positions P1 and P2 move away from each other along the side hn, whereby the graphic of the deformation target can immediately be displayed while deformed into the graphic which has the bisector Q bisecting the area, and the intuitive learning can be performed.

On the other hand, as illustrated in FIG. 27D, while the triangle Z having the bisector Q is displayed, the two points between which the midpoint C is sandwiched are touched on the side h1 having the midpoint C through which the bisector Q passes, and the drag manipulation is performed in the direction in which the distance between the two touch positions shortens, and the touch positions are released (YES in Steps T1 to T5).

Because of the determination that the distance between the multi-touched two positions shortens (YES in Step T18), a drawing operation type "bisector deletion" corresponding to the drag manipulation mode "multi touch on one side+distance between two positions shortens" is read from the drag manipulation/operation corresponding table 22c to perform the operational processing for deleting the bisector Q (Step T19).

The original triangle Z which is formed by deleting the midpoint C and the bisection symbols K1 and K2 is displayed on the touch screen 18 along with the bisector Q (Step T17).

Therefore, on the touch screen 18 on which an arbitrary graphic having the bisector Q is displayed, the two points are multi-touched while the midpoint C of the side hn through which the bisector Q passes is sandwiched between the two points, and the drag manipulation is performed in the direction in which the touch positions come close to each other, whereby the original graphic in which the bisector Q is deleted can immediately be displayed to perform the intuitive learning.

Figure 28:
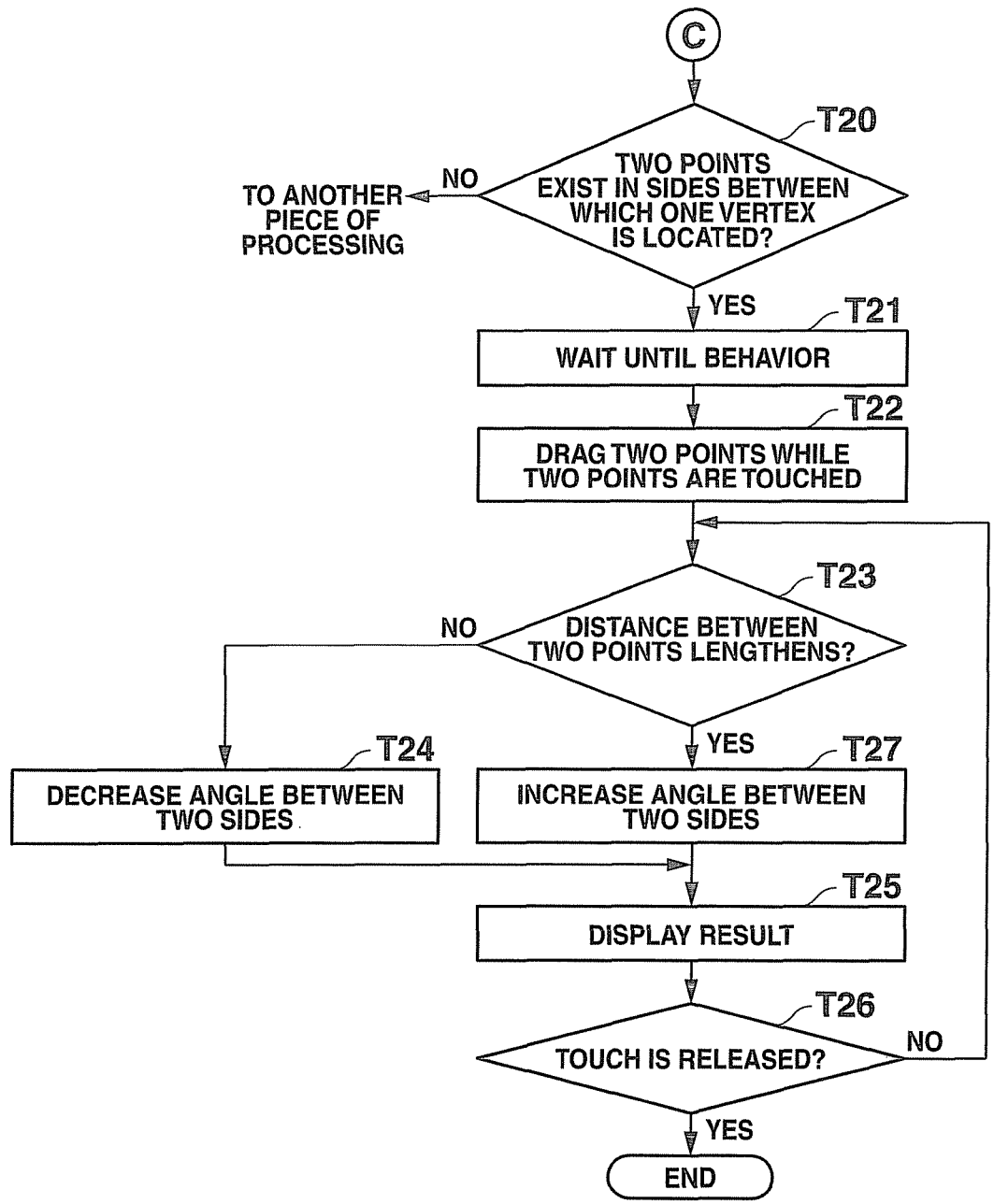
FIG. 28 is a flowchart illustrating graphic deformation operational processing (part 3) in which the touch screen 18 of the graph scientific calculator 10 is used.

FIG. 28 is a flowchart illustrating graphic deformation operational processing (part 3) in which the touch screen 18 of the graph scientific calculator 10 is used.

FIGS. 29A, 29B, 29C, and 29D illustrate a multi-touch manipulation state associated with the graphic deformation operational processing (part 3) of the graph scientific calculator 10 and a display state of a graphic deformed by angle change according to a manipulation mode of the multi-touch manipulation state.

Figure 29A:
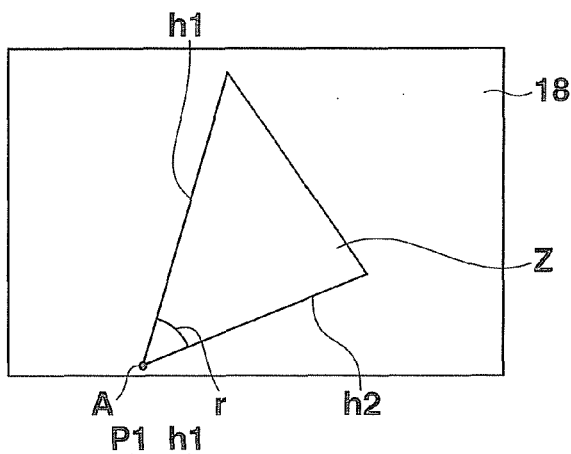
FIGS. 29A, 29B, 29C, and 29D illustrate a multi-touch manipulation state associated with the graphic deformation operational processing (part 3) of the graph scientific calculator 10 and a display state of a graphic deformed by angle change according to a manipulation mode of the multi-touch manipulation state.
Figure 29B:
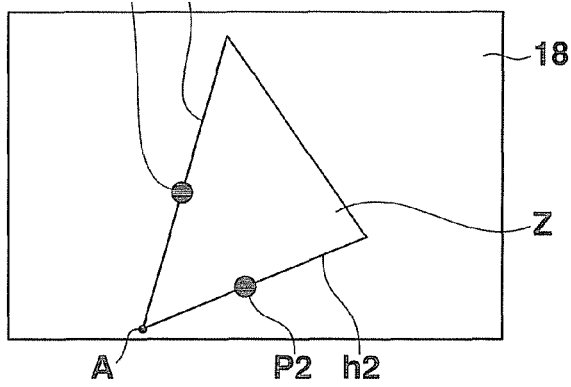

For example, the graphic drawing program 22b is started in response to the user manipulation, and the triangle Z is displayed on the touch screen 18 as illustrated in FIG. 29A. At this point, when the two points P1 and P2 on sides h1 and h2 are touched while an arbitrary vertex A of the triangle Z is sandwiched between the sides h1 and h2 as illustrated in FIG. 29B, it is determined that the two points P1 and P2 are touched based on the coordinate data of each touch position stored in the touch position data memory 26g (YES in Step T1), and that the two points P1 and P2 are located on the sides h1 and h2 between which the vertex A is sandwiched (YES in Step T20).

Figure 29C:
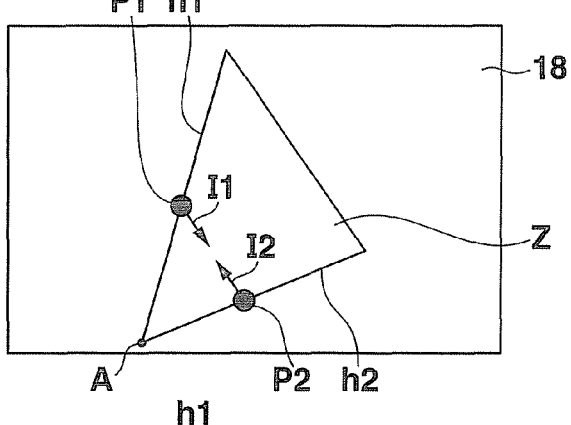

When the user drags the two touch positions P1 and P2 in the direction in which the touch positions P1 and P2 come close to each other as indicated by the arrows I1 and I2 of FIG. 29C, the drag behavior is recognized based on the coordinate data and locus data of each touch position stored in the touch position data memory 26g (Steps T21 and T22), and it is determined that the drag manipulation "distance between two points shortens" is performed (NO in Step T23).

A drawing operation type "decrease in vertex angle" corresponding to a drag manipulation mode "multi touch of two sides between which vertex is sandwiched+distance between two points shortens" is read from the drag manipulation/operation corresponding table 22c to perform the operational processing for decreasing an angle r of the vertex A to deform the triangle (Step T24).

Figure 29D:
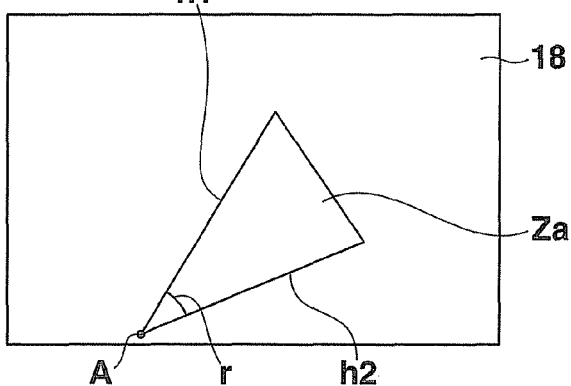

A triangle Za, which is obtained through the operational processing of "decrease in vertex angle" and deformed by decreasing the vertex angle r, is displayed on the touch screen 18 as illustrated in FIG. 29D (Step T25).

Then, as illustrated in FIG. 29D, when the two touch positions P1 and P2 are dragged in the direction so as to move away from each other while the touch manipulation of the points P1 and P2 is maintained on the sides h1 and h2 between which the vertex A of the triangle Za whose vertex angle r is decreased is sandwiched (NO in Step T26), it is determined that the drag manipulation "distance between two points lengthens" is performed (YES in Step T23).

A drawing operation type "increase in vertex angle" corresponding to a drag manipulation mode "multi touch of two sides between which vertex is sandwiched+distance between two points lengthens" is read from the drag manipulation/operation corresponding table 22c to perform the operational processing for increasing the angle r of the vertex A to deform the triangle (Step T27).

The original triangle Z, which is obtained through the operational processing of "increase in vertex angle" and deformed by increasing the vertex angle r, is displayed on the touch screen 18 as illustrated in FIG. 29C (Step T25).

In this manner, on the touch screen 18 on which an arbitrary graphic is displayed, the two points P1 and P2 on the sides h1 and h2 are multi-touched while the vertex A of the graphic Z to be deformed is sandwiched between the sides h1 and h2, and the drag manipulation is performed in the direction in which the two touch positions P1 and P2 come close to or move away from each other, whereby the graphic which is deformed by decreasing or increasing the angle r of the vertex A can immediately be displayed to perform the intuitive learning.

Figure 30:
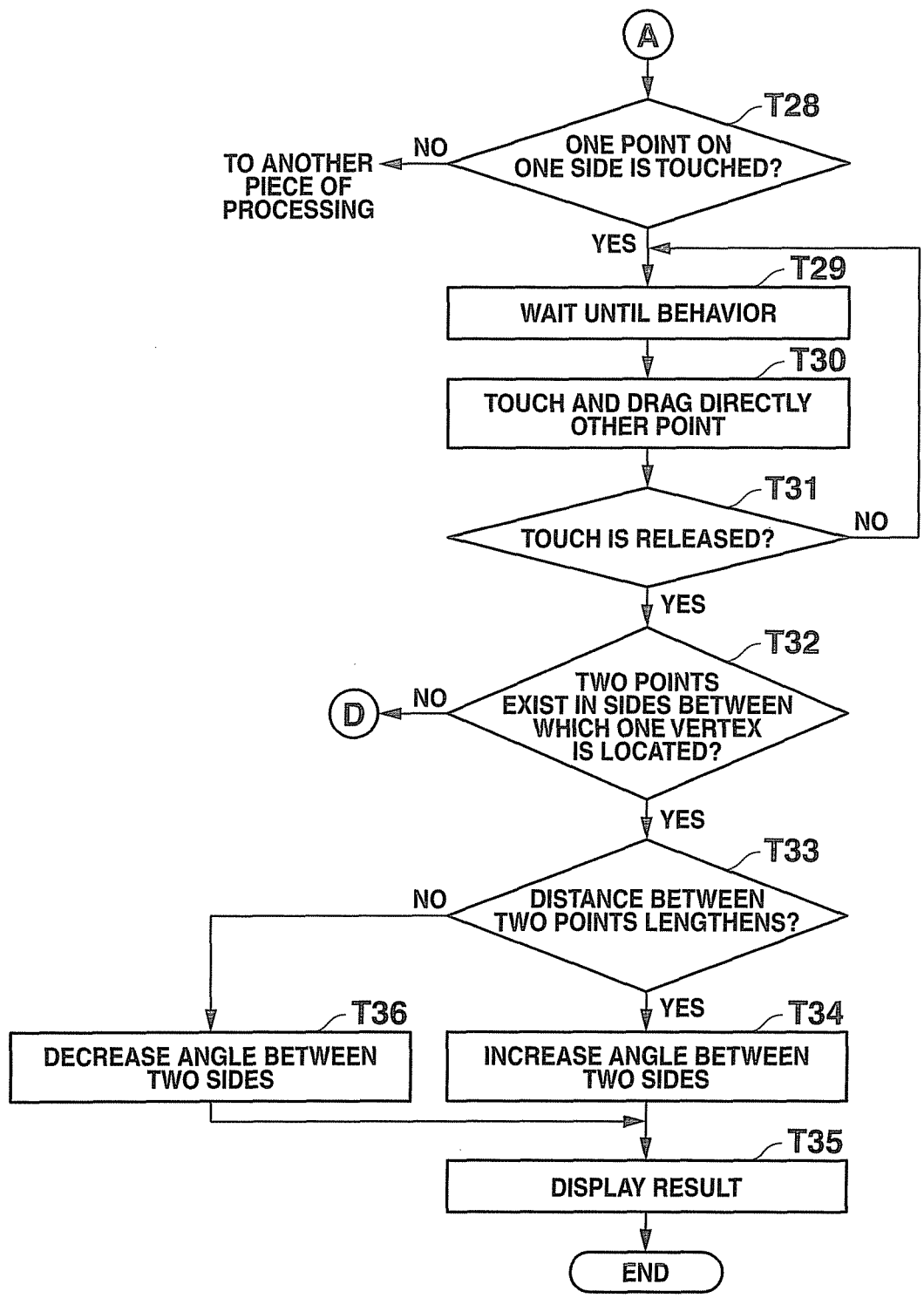
FIG. 30 is a flowchart illustrating graphic deformation operational processing (part 4) in which the touch screen 18 of the graph scientific calculator 10 is used.

FIG. 30 is a flowchart illustrating graphic deformation operational processing (part 4) in which the touch screen 18 of the graph scientific calculator 10 is used.

FIGS. 31A, 31B, 31C, and 31D illustrate a single-touch manipulation state associated with the graphic deformation operational processing (part 4) of the graph scientific calculator 10 and a display state of a graphic deformed by angle change according to a manipulation mode of the single-touch manipulation state.

Figure 31A:
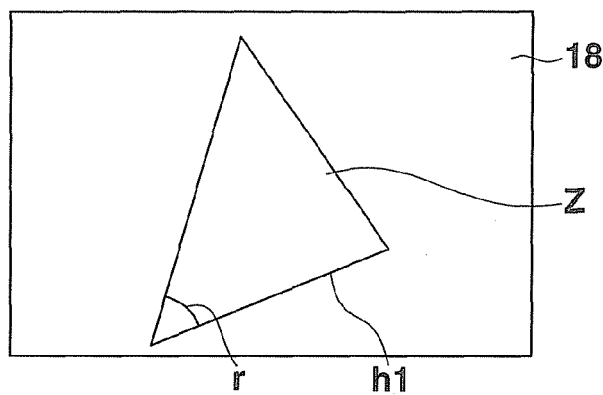
FIGS. 31A, 31B, 31C, and 31D illustrate a single-touch manipulation state associated with the graphic deformation operational processing (part 4) of the graph scientific calculator 10 and a display state of a graphic deformed by angle change according to a manipulation mode of the single-touch manipulation state.
Figure 31B:
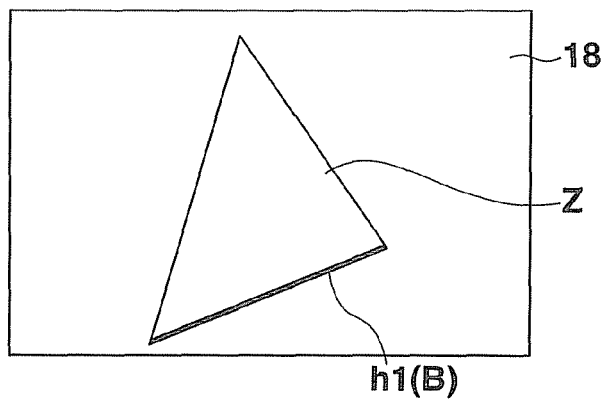

For example, the graphic drawing program 22b is started in response to the user manipulation, and the triangle Z is displayed on the touch screen 18 as illustrated in FIG. 31A. At this point, the user touches one point on the side h1 of the triangle Z, and the touched side h1 is indicated by a bold line B for the purpose of identification as illustrated in FIG. 31B (Step T28).

Figure 31C:
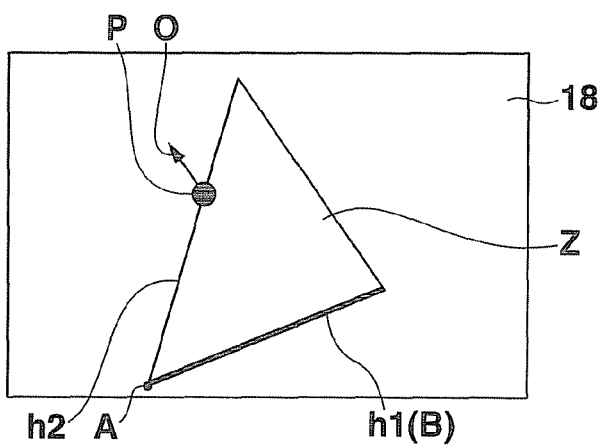

Then, as shown in FIG. 31C, the point P on the side h2 is touched while the vertex A of the triangle Z is sandwiched between the side h2 and the side h1, and the position P on the side h2 is dragged in the direction in which the position P on the side h2 moves away from the side h1 displayed as the bold line B by the first touch manipulation as indicated by the arrow O. Then, the position P on the side h2 is released.

Therefore, the drag behavior is recognized based on the coordinate data and locus data of each touch position stored in the touch position data memory 26g (Steps T29 and T30), and it is determined that the touch manipulation is released (YES in Step T31).

It is determined that the first touch position and the subsequent touch position P exist on the sides h1 and h2 between which the vertex A is sandwiched (YES in Step T32), and that the drag manipulation in which "distance between two points lengthens" is performed (YES in Step T33).

The drawing operation type "increase in vertex angle" corresponding to a drag manipulation mode "distance between two points on sides between which vertex is sandwiched lengthens" is read from the drag manipulation/operation corresponding table 22c to perform the deformation operational processing for obtaining the triangle by increasing the angle r of the vertex A (Step T34).

Figure 31D:
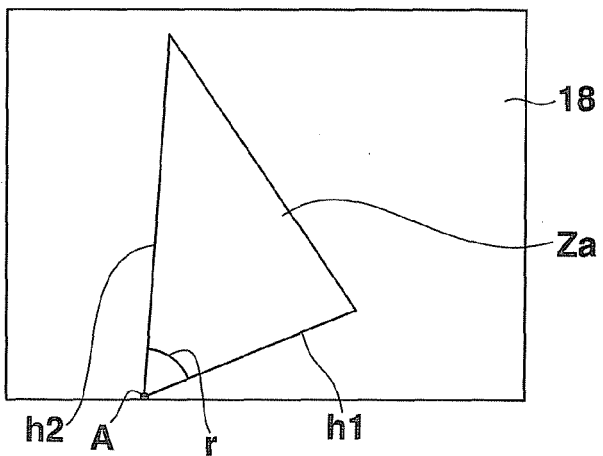

The triangle Za, which is obtained through the operational processing of "increase in vertex angle" and deformed by increasing the vertex angle r, is displayed on the touch screen 18 as illustrated in FIG. 31D (Step T35).

It is determined that the first touch position and the subsequent touch position P exist on the sides h1 and h2 between which the vertex A is sandwiched (YES in Step T32), and that the drag manipulation in which "distance between two points shortens" is performed (NO in Step T33). In such cases, the drawing operation type "decrease in vertex angle" corresponding to a drag manipulation mode "distance between two points on sides between which vertex is sandwiched shortens" is read from the drag manipulation/operation corresponding table 22c to perform the deformation operational processing for obtaining the triangle by decreasing the angle r of the vertex A (Step T36).

As a result, the triangle Z, which is obtained through the operational processing of "decrease in vertex angle" and deformed by decreasing the vertex angle r, is displayed on the touch screen 18 (Step T35).

In this manner, on the touch screen 18 on which an arbitrary graphic is displayed, the two points on the sides h1 and h2 are sequentially single-touched while the vertex A of the graphic Z to be deformed is sandwiched between the sides h1 and h2, and the drag manipulation is performed in the direction in which the subsequent touch position P comes close to or moves away from the first touch position, whereby the graphic which is deformed by decreasing or increasing the angle r of the vertex A can immediately be displayed to perform the intuitive learning.

Figure 32:
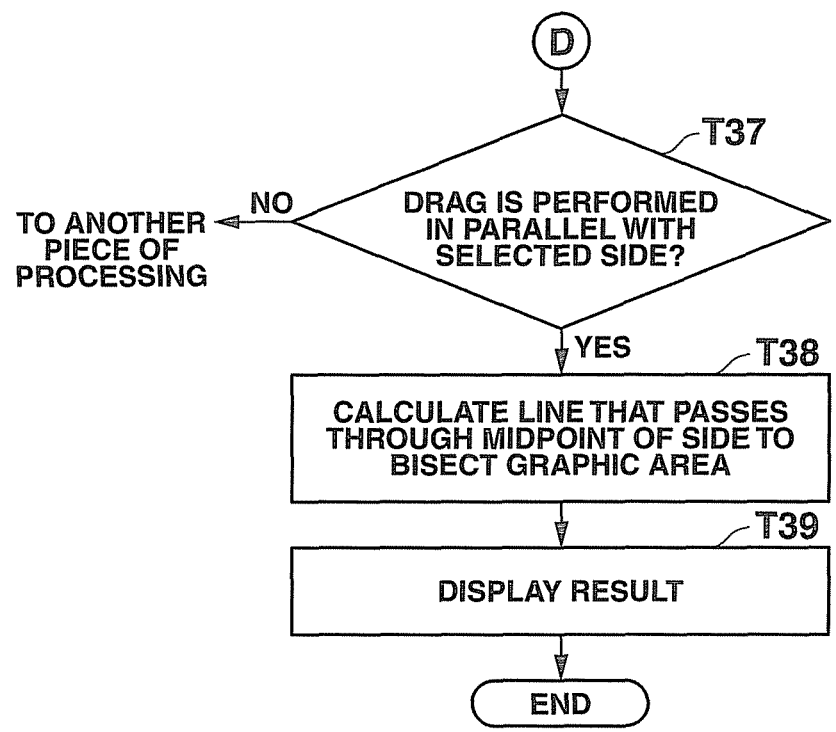
FIG. 32 is a flowchart illustrating graphic deformation operational processing (part 5) in which the touch screen 18 of the graph scientific calculator 10 is used.

FIG. 32 is a flowchart illustrating graphic deformation operational processing (part 5) in which the touch screen 18 of the graph scientific calculator 10 is used.

FIGS. 33A, 33B, 33C, and 33D illustrate a single-touch manipulation state associated with the graphic deformation operational processing (part 5) of the graph scientific calculator 10 and a display state of a graphic bisection-deformed according to a manipulation mode of the single-touch manipulation state.

Figure 33A:
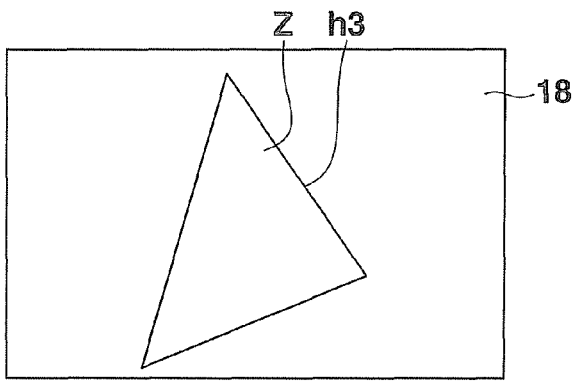
FIGS. 33A, 33B, 33C, and 33D illustrate a single-touch manipulation state associated with the graphic deformation operational processing (part 5) of the graph scientific calculator 10 and a display state of a graphic bisection-deformed according to a manipulation mode of the single-touch manipulation state.
Figure 33B:
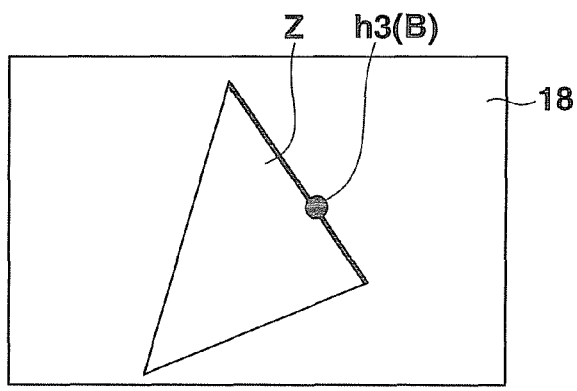

For example, the graphic drawing program 22b is started in response to the user manipulation, and the triangle Z is displayed on the touch screen 18 as illustrated in FIG. 33A. At this point, the user touches one point on an arbitrary side h3 of the triangle Z, and the touched side h3 is indicated by the bold line B for the purpose of identification as illustrated in FIG. 33B (Step T28).

Figure 33C:
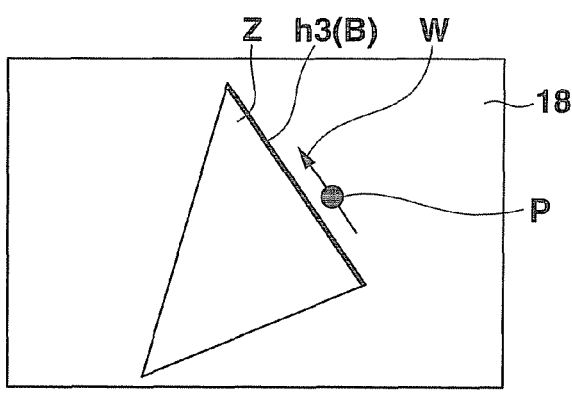

Then, as illustrated in FIG. 33C, the user touches the point P near the side h3 which is selected and displayed as the bold line B by the first touch manipulation, and the touch position P is dragged in parallel with the side h3 as indicated by an arrow W. Then the user releases the touch position P.

Therefore, the drag behavior is recognized based on the coordinate data and locus data of each touch position stored in the touch position data memory 26g (Steps T29 and T30), and it is determined that the touch manipulation is released (YES in Step T31).

At this point, because of the determination that the subsequent touch position P is dragged in parallel with the side h3 selected and displayed by the first touch manipulation (YES in Step T37), the drawing operation type "area bisection" corresponding to the drag manipulation mode "drag parallel to selected side" is read from the drag manipulation/operation corresponding table 22c to perform operational processing for obtaining the midpoint C of the selected side h3 and the line Q which passes through the midpoint C to bisect the triangle Z (Step T38).

Figure 33D:
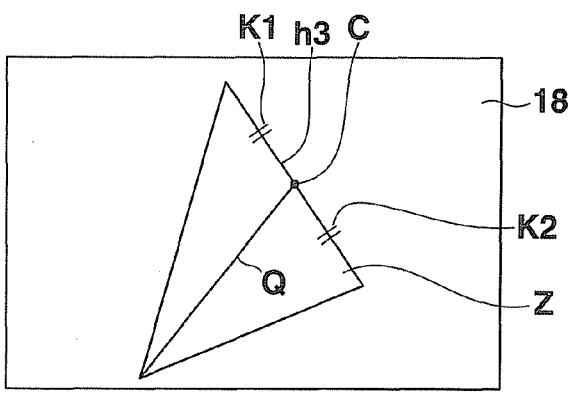

As illustrated in FIG. 33D, the midpoint C of the side h3 and the bisector Q passing through the midpoint C, which are obtained through the "area bisection" operational processing, are displayed along with the bisection symbols K1 and K2 on the touch screen 18 (Step T39).

In this manner, on the touch screen 18 on which an arbitrary graphic is displayed, after the side hn of the graphic Zn to be deformed is previously selected by the single touch, the drag manipulation is performed to the other touch position P near the selected side hn in parallel with the selected side hn, whereby the deformation target graphic can immediately be displayed while deformed into the graphic having the bisector Q bisecting the area, and the intuitive learning can be performed.

Accordingly, according to the graphic deformation operation function of the graph scientific calculator 10 having the above-described configuration, on the touch screen 18 on which an arbitrary graphic is displayed, the multi touch or the single touch is performed on the inside, on each side, or near the side of the deformation target graphic by the user manipulation, and the drag manipulation of the touch position is performed in the intuitive mode corresponding to contents of deformation of the graphic. Therefore, the drag manipulation mode including the touch position and the locus of the touch position of the user manipulation is determined, and the drawing operation type for graphic deformation previously set in the drag manipulation/operation corresponding table 22c is read according to the drag manipulation mode. Then the displayed graphic is deformed through the drawing operational processing corresponding to the drag manipulation mode, and the deformed graphic is displayed on the touch screen 18.

Therefore, the user does not have to memorize such complicated manipulations as the selection of the item from the menu and the command input, and the displayed graphic can be displayed while deformed into the graphic corresponding to the user's intuitive manipulation, so that even junior students can effectively perform the learning.

The operation techniques of the graph scientific calculator (electronic calculator) 10 described in each embodiment, that is, the techniques such as the formula transform operational processing (parts 1 to 11) which is illustrated by the flowcharts of FIGS. 3 to 23C and the mathematical formula displaying behaviors and the graphic deformation operational processing (parts 1 to 5) which is illustrated by the flowcharts of FIGS. 24 to 33D and the graphic displaying behaviors can be distributed as a program which can be executed by a computer while stored in the external storage medium 23 such as a memory card (such as ROM card and RAM card), a magnetic disk (such as floppy disk and hard disk), an optical disk (such as CD-ROM and DVD), and a semiconductor memory. The computer 21 of the graph scientific calculator (electronic calculator) 10 including the touch screen 18 reads the program stored in the external storage medium 23 into the storage devices 22 and 26, and the operation is controlled by the read program, whereby the mathematical formula transform displaying function and the graphic deformation displaying function can be realized in response to the user's intuitive touch and drag manipulation of the embodiments to perform the pieces of processing similar to those of the above-described techniques.

Alternatively, the data of the program for realizing each technique can be transmitted as the program code mode through the communication network (public line) N, and the program data is captured in the computer 11 of the graph scientific calculator (electronic calculator) 10 including the touch screen 18 using the communication device 25 connected to the communication network N, which allows the mathematical formula transform displaying function and the graphic deformation displaying function to be realized.

Alternatively, the program data is captured in the personal computer including the touch screen, which allows the mathematical formula transform displaying function and the graphic deformation displaying function to be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An electronic device comprising:
a display device configured to detect a contact position;
a storage in which data is stored, a touch manipulation mode and operational processing being correlated with each other in the data; and a processor that causes the display device to display a mathematical formula, determines the touch manipulation mode detected by the display device, reads the operational processing corresponding to the determined touch manipulation mode from the storage, performs the operational processing on the mathematical formula displayed on the display device, and causes the display device to display a mathematical formula of result of the performed operational processing, wherein the determined touch manipulation mode includes a mode corresponding to two-point touch manipulation performed on the display device by a user, and wherein, in the storage, the touch manipulation modes which serve as a pair of modes opposite to each other are correlated to the pieces of operational processing which serve as pathways opposite to each other in the data in which the touch manipulation mode and the operational processing are correlated.

2. The electronic device according to claim 1, wherein, in the storage, the pieces of operational processing which serve as the pathways opposite to each other include operational processing from a fraction to a decimal and operational processing from the decimal to the fraction or factorization operational processing and expansion operational processing.

3. The electronic device according to claim 1, wherein the processor determines a range of a mathematical formula defined by the contact position detected by the display device in the mathematical formula displayed on the display device, and the processor performs the operational processing corresponding to the determined touch manipulation mode on the mathematical formula of the determined range.

4. The electronic device according to claim 1, wherein the storage includes data in which the touch manipulation mode and graphic deformation processing are correlated, and the processor causes the display device to display a graphic, performs the graphic deformation processing corresponding to the determined touch manipulation mode on the graphic displayed on the display device, and causes the display device to display a graphic of result of the performed graphic deformation processing.

5. The electronic device according to claim 3, wherein, in the storage, the touch manipulation modes which serve as a pair of modes opposite to each other are correlated to the pieces of graphic deformation processing which serve as pathways opposite to each other in the data in which the touch manipulation mode and the graphic deformation processing are correlated, and the pieces of graphic deformation processing which serve as the pathways opposite to each other include angle increasing deformation processing and angle decreasing deformation processing or graphic dividing deformation processing and graphic combining deformation processing.

6. The electronic device according to claim 1, wherein the mode corresponding to two-point touch manipulation performed on the display device by a user includes a touch manipulation mode in which a starting point in a mathematical, formula on which an operational processing is to be processed is touched and another point is subsequently touched.

7. A non-transitory computer-readable storage medium in which a software program is stored, the software program being executed by a computer system having a display device configured to detect a contact position and a storage, the software program including a sequence of commands for causing the computer system to perform pieces of processing, the pieces of processing comprising:

storing data in the storage, a touch manipulation mode and operational processing being correlated with each other in the data;

causing the display device to display a mathematical formula;

determining the touch manipulation mode detected by the display device;

reading the operational processing corresponding to the determined touch manipulation mode from the storage;

performing the operational processing on the mathematical formula displayed on the display device; and causing the display device to display a mathematical formula of result of the performed operational processing, wherein the determined touch manipulation mode includes a mode corresponding to two-point touch manipulation performed on the display device by a user, and wherein, in the storage, the touch manipulation modes which serve as a pair of modes opposite to each other are correlated to the pieces of operational processing which serve as pathways opposite to each other in the data in which the touch manipulation mode and the operational processing are correlated.

* * * * *